United States Patent
Aso et al.

(10) Patent No.: US 11,078,856 B2
(45) Date of Patent: Aug. 3, 2021

(54) WIEBE FUNCTION PARAMETER IDENTIFICATION METHOD AND INFORMATION PROCESSING DEVICE

(71) Applicant: FUJITSU LIMITED, Kawasaki (JP)

(72) Inventors: Noriyasu Aso, Isehara (JP); Masatoshi Ogawa, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 589 days.

(21) Appl. No.: 15/981,029

(22) Filed: May 16, 2018

(65) Prior Publication Data

US 2018/0313285 A1  Nov. 1, 2018

Related U.S. Application Data

(63) Continuation of application No. PCT/JP2015/082900, filed on Nov. 24, 2015.

(51) Int. Cl.
*F02D 41/26* (2006.01)
*F02D 41/14* (2006.01)
(Continued)

(52) U.S. Cl.
CPC ....... *F02D 41/1401* (2013.01); *F02D 35/023* (2013.01); *F02D 35/028* (2013.01); *F02D 41/009* (2013.01); *F02D 41/1402* (2013.01); *F02D 41/1406* (2013.01); *F02D 41/26* (2013.01); *F02D 41/402* (2013.01); *G06F 17/17* (2013.01); *F02D 41/1454* (2013.01);
(Continued)

(58) Field of Classification Search
CPC ............. F02D 41/1401; F02D 41/1406; F02D 35/023; F02D 41/1402; F02D 41/402; F02D 35/028; F02D 41/009; F02D 41/26; F02D 2250/14; F02D 41/1454; F02D 2041/1433; F02D 2200/0602; F02D 2200/0614; F02D 2200/1004; G06F 17/17; Y02T 10/40

See application file for complete search history.

(56) References Cited

U.S. PATENT DOCUMENTS

| 2005/0273244 A1* | 12/2005 | Cesario | F02D 41/3809 |
| | | | 701/106 |
| 2007/0265805 A1* | 11/2007 | Lee | G01M 15/05 |
| | | | 702/187 |
| 2017/0089283 A1* | 3/2017 | Ogawa | F02D 41/402 |

FOREIGN PATENT DOCUMENTS

| JP | 2007-239524 | 9/2007 |
| JP | 2008-215204 | 9/2008 |

(Continued)

OTHER PUBLICATIONS

Yeliana et al., "Parametric study of burn durations of ethanol-gasoline blends in SI engine over variable compression ratios and EGR levels", MTU, 2010.*

(Continued)

*Primary Examiner* — Kandasamy Thangavelu
(74) *Attorney, Agent, or Firm* — Staas & Halsey LLP

(57) ABSTRACT

A Wiebe function parameter identification method, the method includes: acquiring, by a computer, operation data when an internal-combustion engine is in operation; and identifying values of a plurality of parameters included in a combination of at least two Wiebe functions including a first Wiebe function and a second Wiebe function based on the operation data and a first difference between values of a same parameter of the first Wiebe function and the second Wiebe function.

20 Claims, 25 Drawing Sheets

(51) Int. Cl.
*F02D 35/02* (2006.01)
*F02D 41/40* (2006.01)
*F02D 41/00* (2006.01)
*G06F 17/17* (2006.01)

(52) U.S. Cl.
CPC ............ *F02D 2041/1433* (2013.01); *F02D 2200/0602* (2013.01); *F02D 2200/0614* (2013.01); *F02D 2200/1004* (2013.01); *F02D 2250/14* (2013.01)

(56) References Cited

FOREIGN PATENT DOCUMENTS

| | | | | | |
|---|---|---|---|---|---|
| JP | 4577239 | B2 | * | 11/2010 | ............ F02D 41/402 |
| JP | 4581993 | B2 | * | 11/2010 | ............ F02D 45/00 |
| JP | 4605060 | B2 | * | 1/2011 | ............ F02D 43/00 |
| JP | 2011-106334 | | | 6/2011 | |
| JP | 201402580 | A | * | 2/2014 | ............ F02D 45/00 |
| JP | 2014214647 | A | * | 11/2014 | ............ F02D 45/00 |
| JP | 2014240617 | A | * | 12/2014 | ............ F02D 45/00 |
| JP | 2015001156 | A | * | 1/2015 | ............ F02D 45/00 |
| WO | WO 2013080585 | A1 | * | 6/2013 | ............ F02D 45/00 |

OTHER PUBLICATIONS

Ghojel, J.I., "Review of the development and application of the Wiebe function", Monash University, Australia, May 2010.*
Kamaltdinov et al., "Determining parameters of Double-Wiebe function for simulation of combustion process in overload diesel engine . . . ", Material science and engineering, 2018.*
Yelian et al., "Analytical solutions of double Wiebe function parameters for burn durations . . . ", MTU, 2010.*
International Written Opinion, PCT/ISA/237, dated Feb. 9, 2016, in corresponding International Patent Application No. PCT/JP2015/082900.
International Search Report, PCT/ISA/210, dated Feb. 9, 2016, in corresponding International Patent Application No. PCT/JP2015/082900.

* cited by examiner

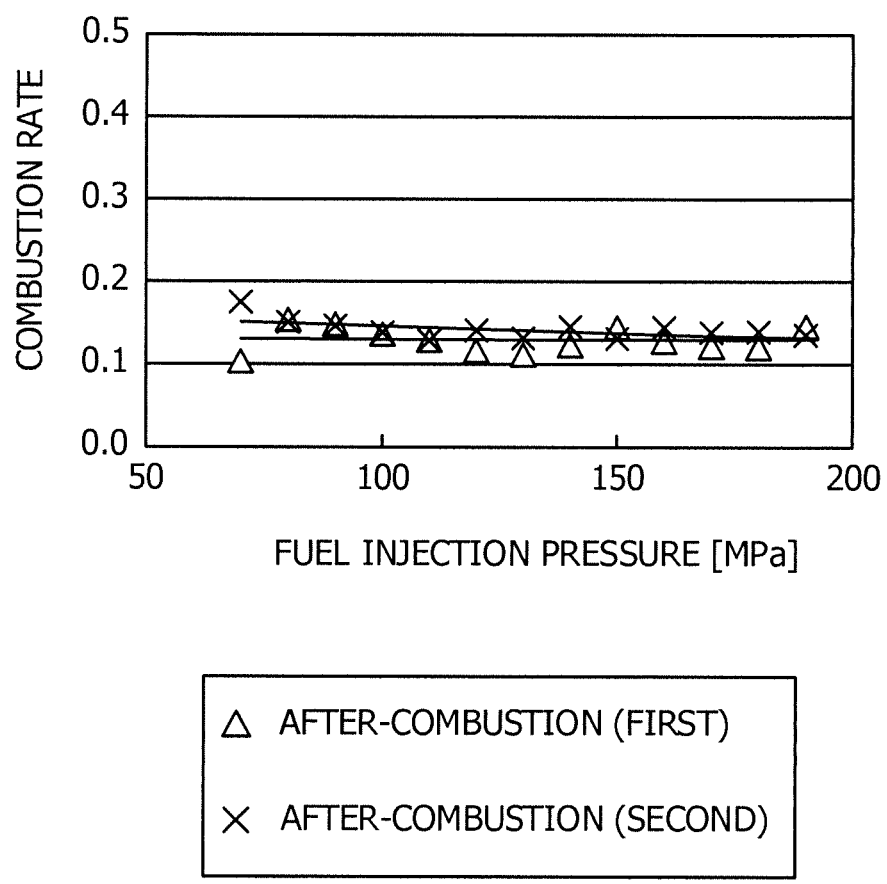

FIG. 10

| OPERATING CONDITION ID | OPERATING CONDITION | | | | | | | IN-CYLINDER PRESSURE DATA |
|---|---|---|---|---|---|---|---|---|
| | NUMBER OF REVOLUTION | FUEL INJECTION AMOUNT | | | | FUEL INJECTION PRESSURE | OXYGEN CONCENTRATION | |
| | | PILOT INJECTION | PRE-INJECTION | MAIN INJECTION | ... | | | |
| 0001 | 1600 | 5 | 5 | 30 | ... | 150 | 18% | ... |
| 0002 | 2400 | 1 | 2 | 20 | ... | 160 | 20% | ... |
| ... | ... | ... | ... | ... | ... | ... | ... | ... |

WIEBE FUNCTION PARAMETER IDENTIFICATION METHOD AND INFORMATION PROCESSING DEVICE

CROSS-REFERENCE TO RELATED APPLICATION

This application is a continuation application of International Application PCT/JP2015/082900 filed on Nov. 24, 2015 and designated the U.S., the entire contents of which are incorporated herein by reference.

FIELD

The embodiment discussed herein is related to a Wiebe function parameter identification method and an information processing device.

BACKGROUND

A Triple-Wiebe function model is known, which is a combination of at least two Wiebe functions (see, for example, Japanese Laid-open Patent Publication No. 2011-106334)

Although a technique in related art uses a combination of at least two Wiebe functions, it is difficult to identify the parameter values of each Wiebe function so that the Wiebe function matches a combustion waveform according to a corresponding combustion type in various operating conditions. Therefore, with a technique in related art, it is difficult to estimate the rate of heat release with high accuracy based on the combination of at least two Wiebe functions in various operating conditions.

Thus, the present disclosure provides a Wiebe function parameter identification method and a Wiebe function parameter identification device capable of identifying the parameter values of each Wiebe function in a state which allows the rate of heat release to be estimated with high accuracy in various operating conditions.

SUMMARY

According to an aspect of the embodiments, a Wiebe function parameter identification method, the method includes: acquiring, by a computer, operation data when an internal-combustion engine is in operation; and identifying values of a plurality of parameters included in a combination of at least two Wiebe functions including a first Wiebe function and a second Wiebe function based on the operation data and a first difference between values of a same parameter of the first Wiebe function and the second Wiebe function.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7B is a graph illustrating an identification result according to the embodiment when a fuel injection pressure is changed;

FIG. 10 is a table conceptually illustrating example operation data stored in an operation data memory unit;

DESCRIPTION OF EMBODIMENTS

Hereinafter, each example will be described in detail with reference to the accompanying drawings.

Here, first, the basic point of a Wiebe function will be described with reference to FIGS. 1 and 2.

Figure 1:
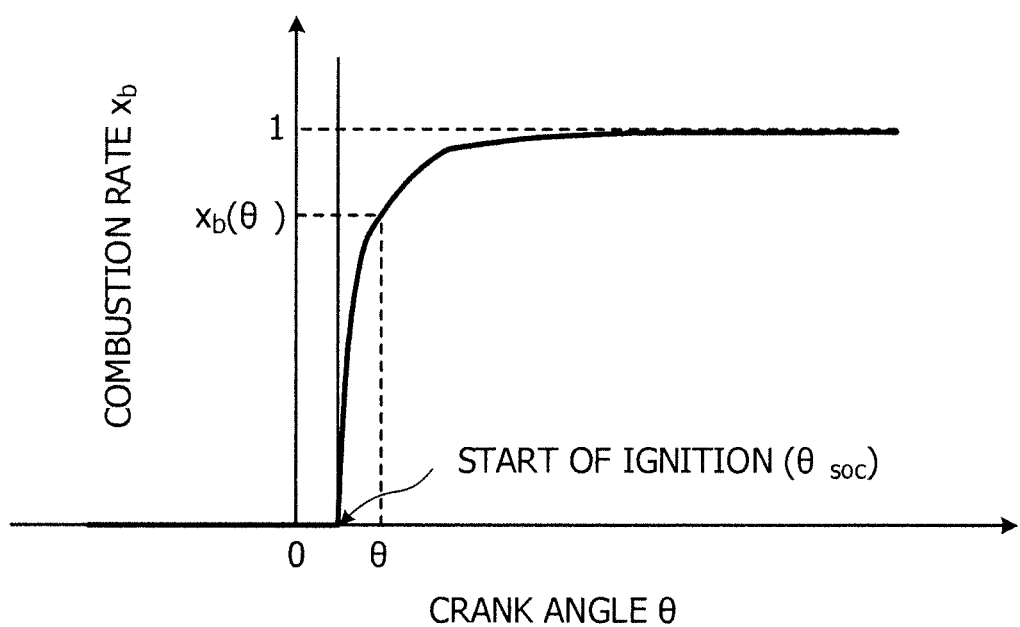
FIG. 1 is a graph illustrating a relationship between a Wiebe function and a combustion rate.

FIG. 1 is a graph illustrating a relationship between a Wiebe function and a combustion rate. FIG. 2 is a graph illustrating a relationship between a Wiebe function and a rate of heat release.

A Wiebe function is known as an approximation function of a heat generation pattern (combustion waveform). Specifically, a Wiebe function is a function that approximates the profile of combustion rate $x_b$ calculated from a combustion pressure, and is given by the following expression for a crank angle θ.

$$x_b(\theta) = 1 - \exp\left\{-a \cdot \left[\frac{\theta - \theta_{soc}}{\Delta\theta}\right]^{m+1}\right\} \quad \text{[Math 1]}$$

Here, a and m each indicate a shape index, $\theta_{soc}$ indicates a combustion start time, and Δθ indicates a combustion period. These four parameters a, m, $\theta_{soc}$, and Δθ are called Wiebe function parameters, and are herein simply referred to as "parameters". FIG. 1 illustrates a relationship between a Wiebe function and a combustion rate $x_b$, where the horizontal axis indicates crank angle θ and the vertical axis indicates combustion rate $x_b$. The rate of heat release in a cylinder is represented by the following expression using these four parameters.

$$ROHR(\theta) = \quad \text{[Math 2]}$$
$$\frac{dQ}{d\theta} = Q_b \cdot a \cdot (m+1)\frac{1}{\Delta\theta} \cdot \left[\frac{\theta - \theta_{soc}}{\Delta\theta}\right]^m \cdot \exp\left\{-a \cdot \left[\frac{\theta - \theta_{soc}}{\Delta\theta}\right]^{m+1}\right\}$$

Here, $Q_b$ is the total amount of heat release in a cylinder. For the value of the total amount $Q_b$ of heat release, a value calculated based a fuel injection amount may be used.

In addition, the total amount of heat release from a combustion start time $\theta_{soc}$ to a certain time Θ is expressed by the following expression.

$$HR(\Theta) = \int_{\theta_{soc}}^{\Theta} ROHR_{wiebe} d\theta \quad \text{[Math 3]}$$

Figure 2:
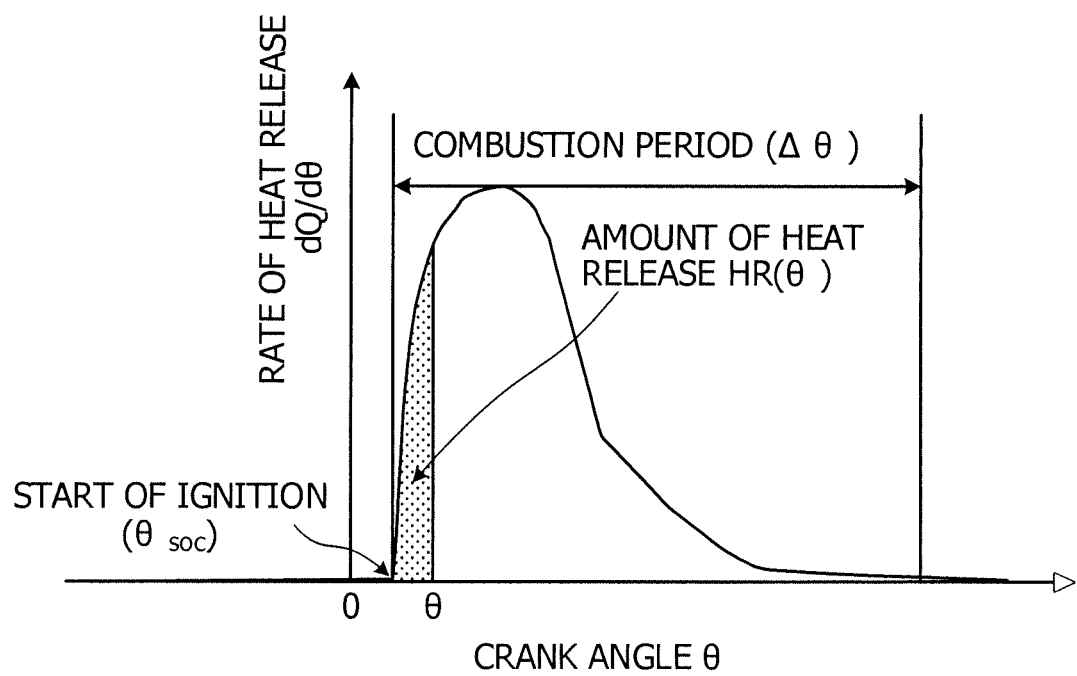
FIG. 2 is a graph illustrating a relationship between a Wiebe function and a rate of heat release.

FIG. 2 illustrates a relationship between a Wiebe function and a rate of heat release $dQ_b/d\theta$, where the horizontal axis indicates crank angle θ, and the vertical axis indicates $dQ_b/d\theta$. In FIG. 2, the total amount of heat release HR (Θ) when the crank angle θ=Θ is indicated by a hatched range.

Next, the parameter identification method according to the embodiment will be described.

In the embodiment, a modeling method using a combination of multiple Wiebe functions is used. For instance, a modeling method using a combination of (N+1) Wiebe functions is used as follows.

$$ROHR_{total} = \sum_{i=1}^{N+1} ROHR_i \quad \text{[Math 4]}$$
$$= \sum_{i=1}^{N+1} Q_b \cdot xf_i \cdot \frac{dx_b}{d\theta}$$
$$= \sum_{i=1}^{N+1} Q_b \cdot xf_i \cdot a_i(m_i+1) \cdot \frac{1}{\Delta\theta_i} \cdot \left[\frac{\theta - \theta_{soc_i}}{\Delta\theta_i}\right]^{m_i} \cdot$$
$$\exp\left\{-a_i \cdot \left[\frac{\theta - \theta_{soc_i}}{\Delta\theta_i}\right]^{m_i+1}\right\}$$

Here, xf is a combustion rate. The expression of Math 4 corresponds to an additive combination of (N+1) terms, each of which is the product of the expression of Math 2 and a combustion rate xf.

Hereinafter, each Wiebe function to be combined in Σ in the expression of Math 4 is simply referred to as "Wiebe function". Also, when a specific Wiebe function in Σ in the expression of Math 4 is indicated, the Wiebe function is also referred to as "Wiebe function for i=k" (where k is any integer between 1 and (N+1) both inclusive). Also, the entire right-hand side in the expression of Math 4 is also referred to as the "combination Wiebe function".

With such a modeling method using the combination Wiebe function, even when multiple combustion configurations in different combustion types are present in one cycle, highly accurate modeling is possible. For instance, the modeling method of Math 4 is preferable when (N+1) combustion configurations in different combustion types are present in one cycle. The combustion configurations in different combustion types are such combustion configurations that have for instance, significantly different relationships between the crank angle θ and the rate of heat release as illustrated in FIG. 2. It is to be noted that the rate of heat release in the case of multi-stage injection as in the latest diesel engine is the rate obtained by combining the rates of heat release in the stages, and thus a modeling method using the combination Wiebe function is useful. It is to be noted that not only in a diesel engine but also in a gasoline engine, multiple combustion configurations in different combustion types may be present in one cycle. Although an embodiment particularly for a diesel engine will be described below, the embodiment is applicable to other engines such as a gasoline engine.

Here, when the values of parameters to be identified in the expression of Math 4 are the values of four parameters a, m, $\theta_{soc}$, and Δθ, the number of values of parameters to be identified is 4×(N+1) because (N+1) Wiebe functions are present. It is to be noted that the value of the combustion rate xf may be included in the values of parameters to be identified. Also, the parameter a may be, for instance, a fixed value such as 6.9. Hereinafter, each value of these parameters a, m, $\theta_{soc}$, and Δθ are referred to as a value, m value, $\theta_{soc}$ value, and Δθ value, respectively.

In the embodiment, an evaluation expression (evaluation function) for identifying the values of parameters includes the difference between m values and the difference between Δθ values of respective Wiebe functions of two combustion configurations in different combustion types. Specifically, for instance, the evaluation function F is as follows.

$$F = \min\{\Sigma(\text{score\_rohr}) - \text{score\_}m - \text{score\_}\Delta\theta\} \quad \text{[Math 5]}$$

In the expression of Math 5, Σ indicates a cumulative value of each evaluation value score_rohr for each crank angle, for instance, in one cycle or a combustion period. Here, a first evaluation value score_rohr is an evaluation value for rate of heat release (ROHR), and is, for instance, as follows.

$$\text{score\_rohr} = (ROHR_{act} - ROHR_w)^2 \quad \text{[Math 6]}$$

In the expression of Math 6, $ROHR_{act}$ is a calculated value of the rate of heat release based on the operation data (actually measured internal pressure of the cylinder), whereas $ROHR_w$ is a calculated value of the rate of heat release $ROHR_{total}$ obtained based on the expression of Math 4.

A second evaluation value score_m is an evaluation value for the difference between m values of respective Wiebe functions of two combustion configurations in different combustion types, and is, for instance, as follows.

$$\text{score\_}m = (m_{k1} - m_{k2})^2 \quad \text{[Math 7]}$$

In the expression of Math 7, the difference between the m value of Wiebe function for i=k1 and the m value of Wiebe function for i=k2 is used. Here, it is assumed that the two combustion configurations in different combustion types are the combustion configuration for i=k1 and the combustion configuration for i=k2 in the expression of Math 4.

A third evaluation value score_$\Delta\theta$ is an evaluation value for the difference between $\Delta\theta$ values of respective Wiebe functions of two combustion configurations in different combustion types, and is, for instance, as follows.

$$\text{score\_}\Delta\theta = (\Delta\theta_{k1} - \Delta\theta_{k2})^2 \quad \text{[Math 8]}$$

Each parameter included in Math 4 is identified as the value that minimizes the evaluation function F. In this process, the value of each parameter which minimizes the evaluation function F may be derived by optimization calculation using an interior point method or a sequential design method. Also, for the optimization calculation, other restraint conditions may be imposed. The other restraint conditions may include, for instance, the condition that the total of combustion rates xfi is approximately 1 and the condition that the combustion rate xf of Wiebe function for the main combustion is greater than the combustion rate xf of Wiebe function for another combustion.

Here, the smaller the first evaluation value score_rohr, the smaller the value of the evaluation function F. In other words, for a smaller first evaluation value score_rohr, the evaluation function F in Math 5 includes the term ($\Sigma$(score_rohr)) closer to an optimal solution. This is because the first evaluation value score_rohr is an evaluation value for evaluating the error between the calculation value of the rate of heat release based on the operation data (actually measured internal pressure of the cylinder) and the calculation value by the combination Wiebe function.

In contrast, the larger the second evaluation value score_m, the smaller the value of the evaluation function F. In other words, for a larger second evaluation value score_m, the evaluation function F in Math 5 includes the term ($\Sigma$(score_m)) closer to an optimal solution. This is because for a larger second evaluation value score_m, a larger difference occurs between m values of respective Wiebe functions of two combustion configurations in different combustion types, which means that the two combustion configurations are likely to be differentiated in shape by a certain tendency.

Similarly, the larger the third evaluation value score_$\Delta\theta$, the smaller the value of the evaluation function F. In other words, for a larger third evaluation value score_$\Delta\theta$, the evaluation function F in Math 5 includes the term ($\Sigma$(score_$\Delta\theta$)) closer to an optimal solution. This is because for a larger third evaluation value score_$\Delta\theta$, a larger difference occurs between $\Delta\theta$ values of respective Wiebe functions of two combustion configurations in different combustion types, which means that the two combustion configurations are likely to be differentiated in time by a certain tendency.

In this manner, according to the embodiment, the evaluation expression for identifying the values of parameters includes the second evaluation value score_m for the difference between the m values and the third evaluation value score_$\Delta\theta$ for the difference between the $\Delta\theta$ values. Thus, even when two combustion configurations in different combustion types occur closely or concurrently in time, it is possible to identify the parameter values of each Wiebe function in a state which allows the rate of heat release to be estimated with high accuracy in various operating conditions. This effect will be further described with reference to FIG. 3 below.

It is to be noted that the evaluation function F is not limited to the function expressed by Math 5, and may be another function. For instance, parameter identification with further increased accuracy is also achievable by weighting each evaluation value, and adjusting a weighted value. Specifically, the evaluation function F below may be used.

$$F = \min\{w_c \times \Sigma(\text{score\_rohr}) - w_a \times \text{score\_}m - w_b \times \text{score\_}\Delta\theta\} \quad \text{[Math 9]}$$

Here, $w_a$, $w_b$, and $w_c$ are respective weighting values (weighting coefficients) for the first to third evaluation values. It is to be noted that wc may be omitted. In other words, $w_c$ may be set to 1.

Figure 3:
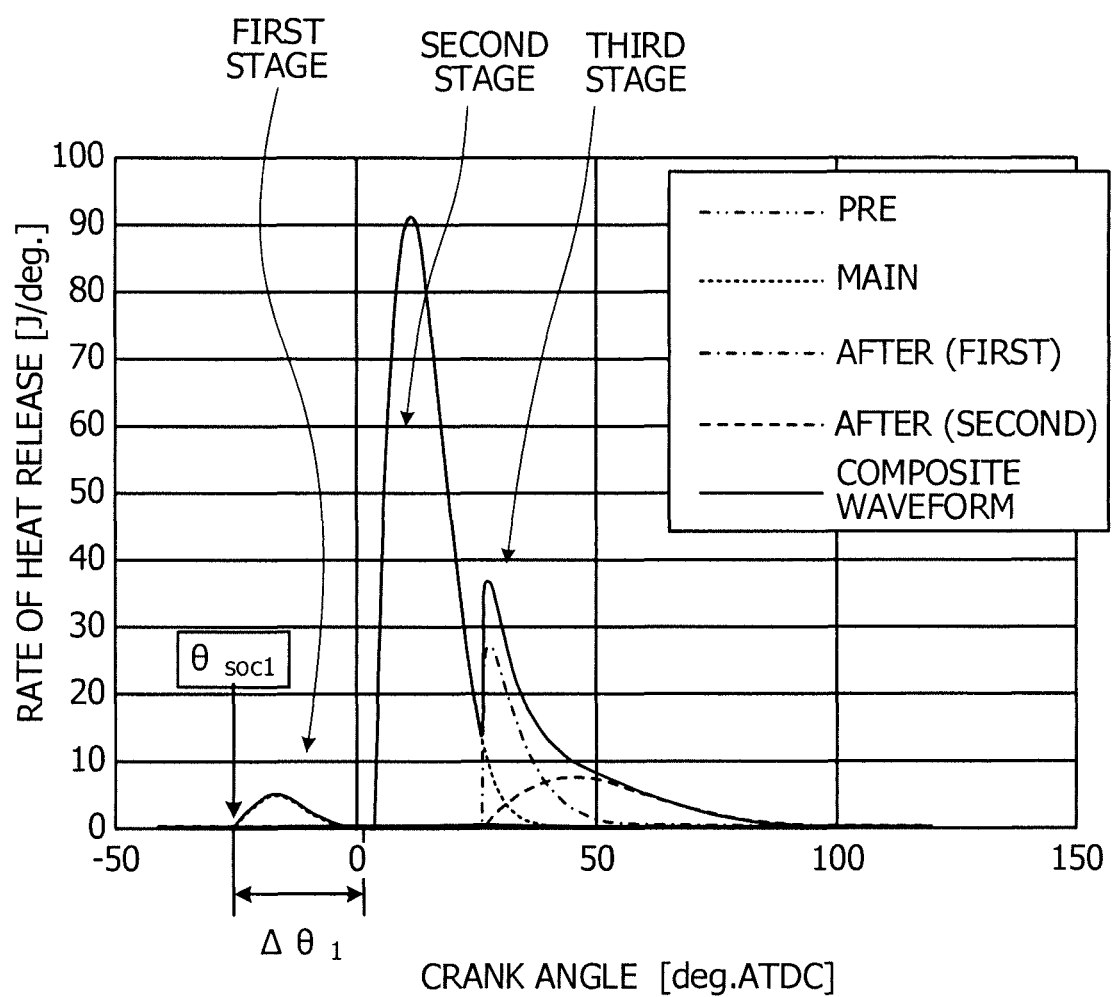
FIG. 3 is a graph illustrating a relationship between a Wiebe function and a rate of heat release in the case of three-stage injection.

FIG. 3 illustrates the waveform (hereinafter also referred to as the "combustion waveform") that indicates a relationship between crank angle $\theta$ and rate of heat release in the case of three-stage injection by a diesel engine. FIG. 3 illustrates the combustion waveform for pre-combustion by a first stage injection, the combustion waveform for the main combustion by a second stage injection, and the respective combustion waveforms for the first combustion and the second combustion (diffusion combustion) of after-combustion by a third stage injection, and a composite waveform of those combustion waveforms.

Meanwhile, the combustion configuration of a diesel engine has premix combustion and diffusion combustion. Although it is possible to represent the combustion of a diesel engine by Wiebe functions, it is difficult to represent the latter half of the combustion by one Wiebe function. This is because the three-stage combustion as illustrated in FIG. 3 includes the first combustion and the second combustion (diffusion combustion) of after-combustion. Thus, representation is made by two Wiebe functions. Therefore, in the embodiment, N=3 in the expression of Math 4, and four Wiebe functions are used. That is, N corresponds to the number of injections. In this case, the number of values of parameters to be identified in the expression of Math 4 is 20 including the combustion rates xf.

However, as illustrated in FIG. 3, the first combustion and the second combustion of the after-combustion are continuous phenomena, and redundancy is present between both combustion.

Therefore, it is difficult to separate two both Wiebe functions by an identification method in related art. For instance, here, as an identification method according to a comparative example, a method of identifying parameters is assumed, which minimizes the error between the rate of heat release detected by an in-cylinder pressure sensor and the rate of heat release calculated by a Wiebe function. That is, the evaluation function F is, for instance, as follows.

$$F = \min\{\Sigma(\text{score\_rohr})\} \quad \text{[Math 10]}$$

FIGS. 4A to 4D are graphs each illustrating a combustion waveform based on various identification results for the latter half of the combustion of FIG. 3. FIGS. 4A to 4D illustrate the waveform of $\text{ROHR}_{act}$, the waveform of $\text{ROHR}_{cal\_after1}$ calculated by a Wiebe function for the first combustion of the after-combustion, and the waveform of $\text{ROHR}_{cal\_after2}$ calculated by a Wiebe function for the second combustion of the after-combustion. In addition, FIGS. 4A to 4D illustrate a composite waveform $\text{ROHR}_{cal\_composition}$ of the waveform of $\text{ROHR}_{cal\_after1}$ and the waveform of $\text{ROHR}_{cal\_after2}$.

Figure 4A:
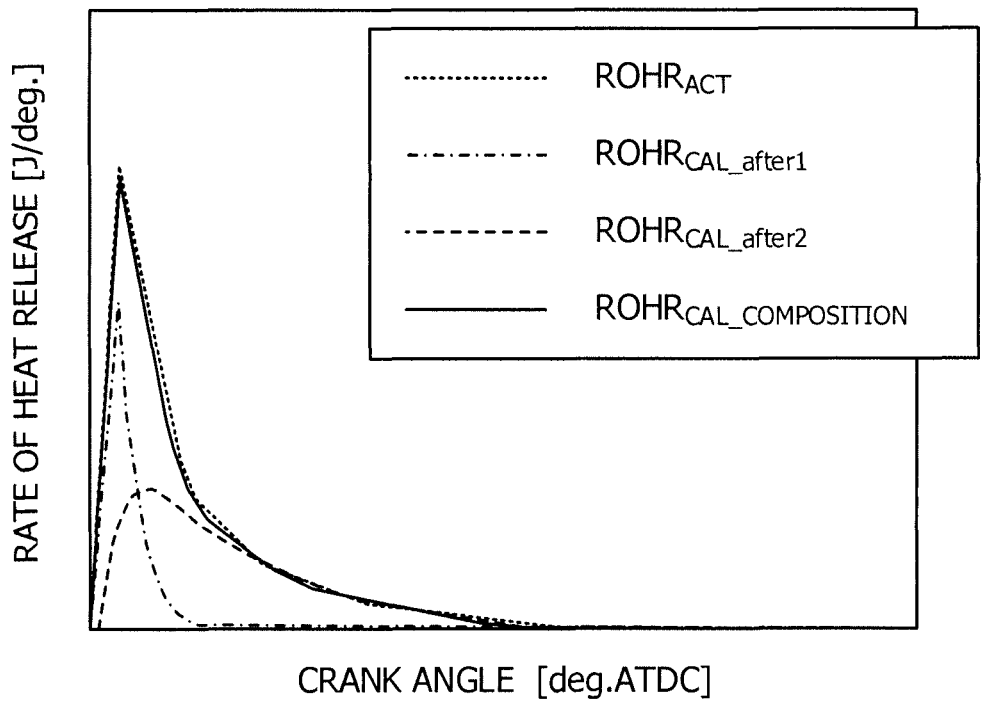
FIG. 4A is an explanatory graph of accuracy of an identification result.
Figure 4B:
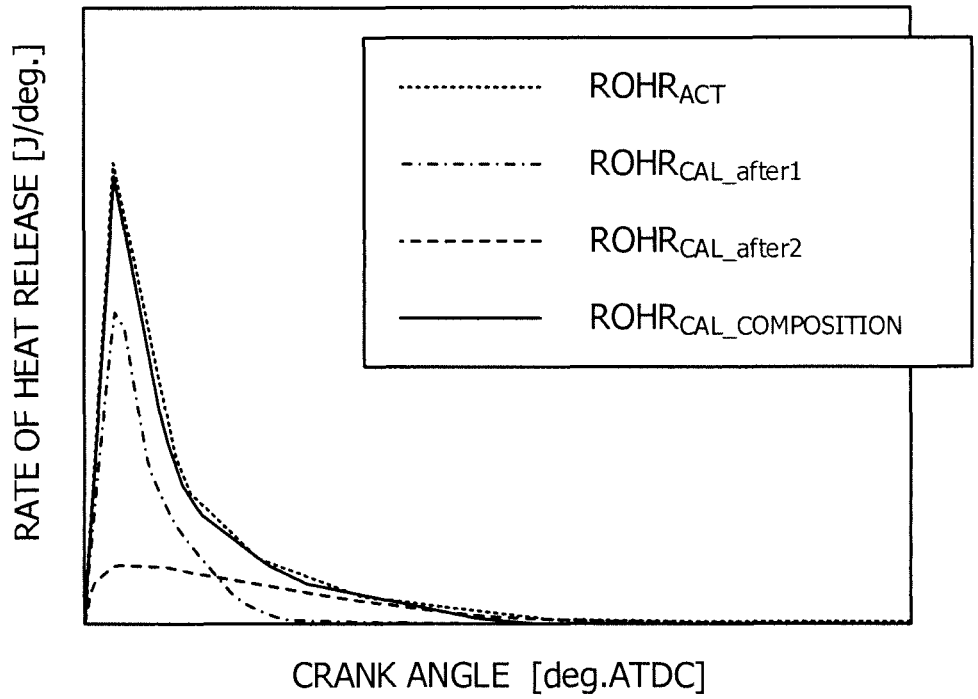
FIG. 4B is an explanatory graph of accuracy of an identification result.
Figure 4C:
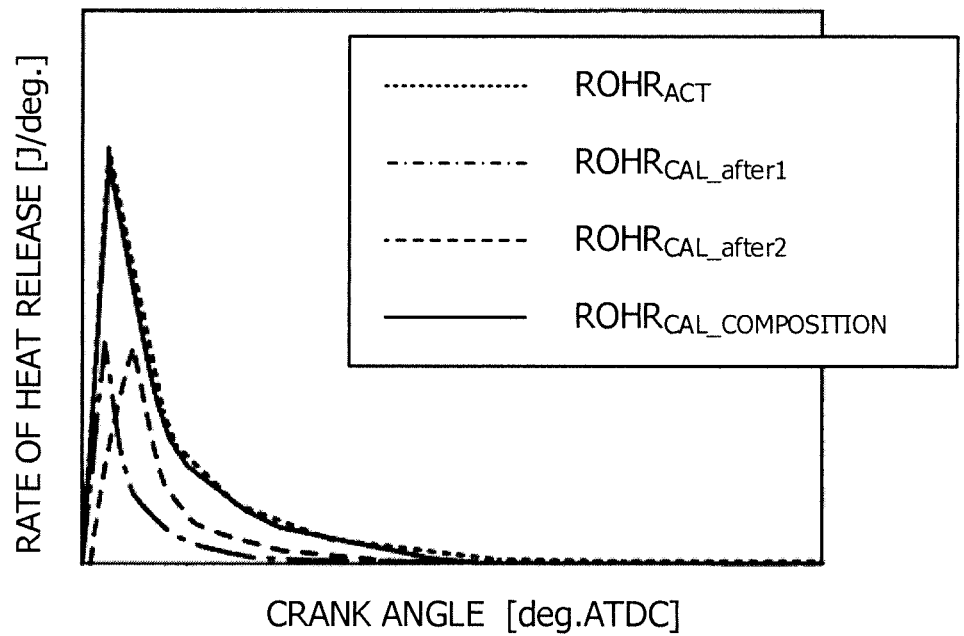
FIG. 4C is an explanatory graph of accuracy of an identification result.
Figure 4D:
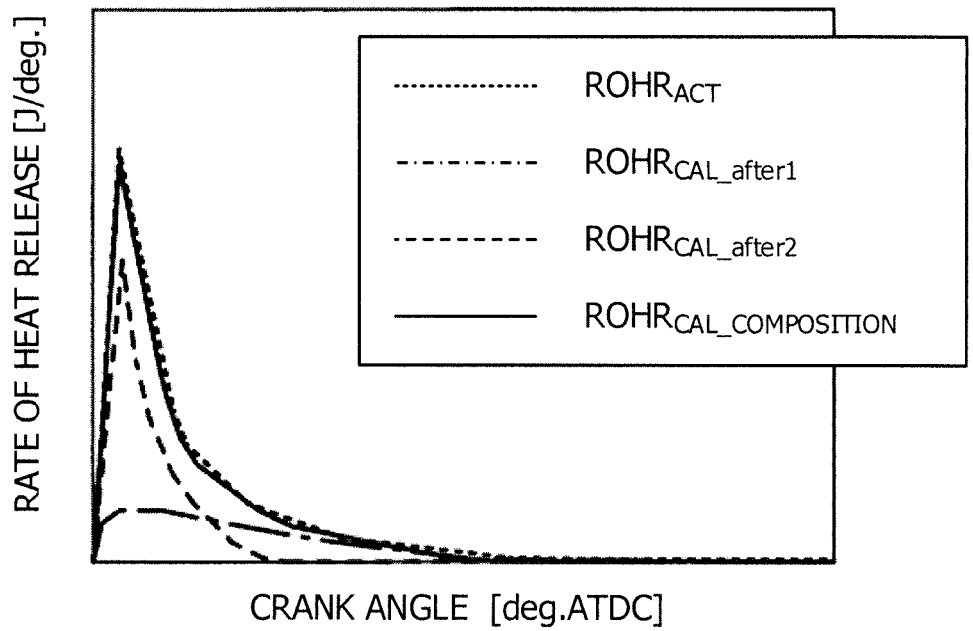
FIG. 4D is an explanatory graph of accuracy of an identification result.

All the identification results illustrated in FIGS. 4A to 4D indicate that the composite waveform $ROHR_{cal\_composition}$ essentially matches the waveform of $ROHR_{act}$, and thus the identification accuracy is high. However, in the example illustrated in FIGS. 4B to 4D, the individual waveform of $ROHR_{cal\_after1}$ and waveform of $ROHR_{cal\_after2}$ forming the waveform of $ROHR_{cal\_composition}$ deviate from the ideal waveforms illustrated in FIG. 3. Specifically, in the example illustrated in FIG. 4A, the waveform of $ROHR_{cal\_after1}$ and the waveform of $ROHR_{cal\_after2}$ correspond to the waveforms illustrated in FIG. 3, whereas in the example illustrated in FIGS. 4B to 4D, the waveform of $ROHR_{cal\_after1}$ and the waveform of $ROHR_{cal\_after2}$ do not correspond to the waveforms illustrated in FIG. 3. Like this, even when the composite waveform $ROHR_{cal\_composition}$ is identified so as to match the waveform of $ROHR_{act}$, the waveform of $ROHR_{cal\_after1}$ and the waveform of $ROHR_{cal\_after2}$ may not correspond to the waveforms illustrated in FIG. 3. In other words, similarly to the above-described identification method according to the embodiment (see FIG. 5), even with an identification method according to a comparative example, it is possible to identify the parameters so that the composite waveform $ROHR_{cal\_composition}$ matches the waveform of $ROHR_{act}$. However, with an identification method according to a comparative example, for instance, as illustrated in FIGS. 4B to 4D, the waveform of $ROHR_{cal\_after1}$ and the waveform of $ROHR_{cal\_after2}$ may not correspond to the waveforms illustrated in FIG. 3 depending on the operating conditions of an internal-combustion engine.

Figure 5:
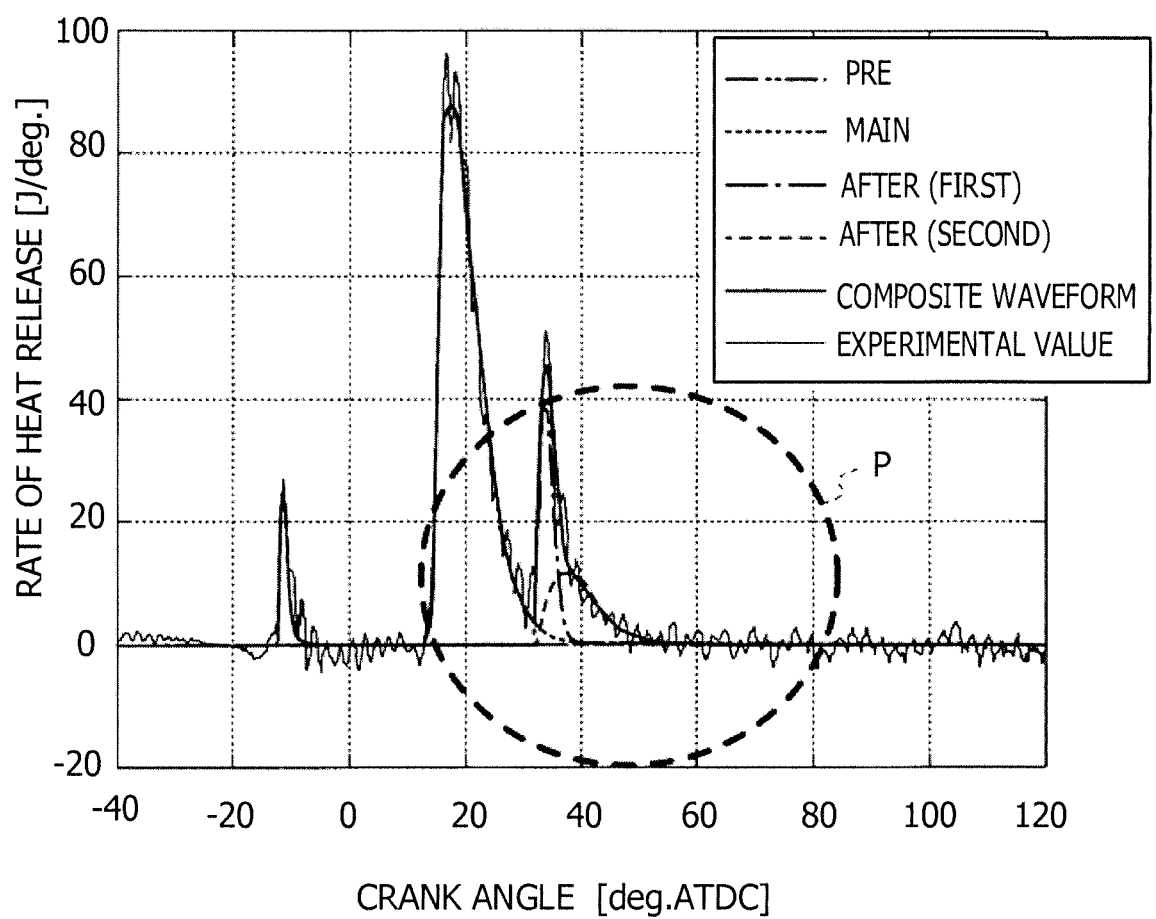
FIG. 5 is a graph of an identification result according to an embodiment.
Figure 6:
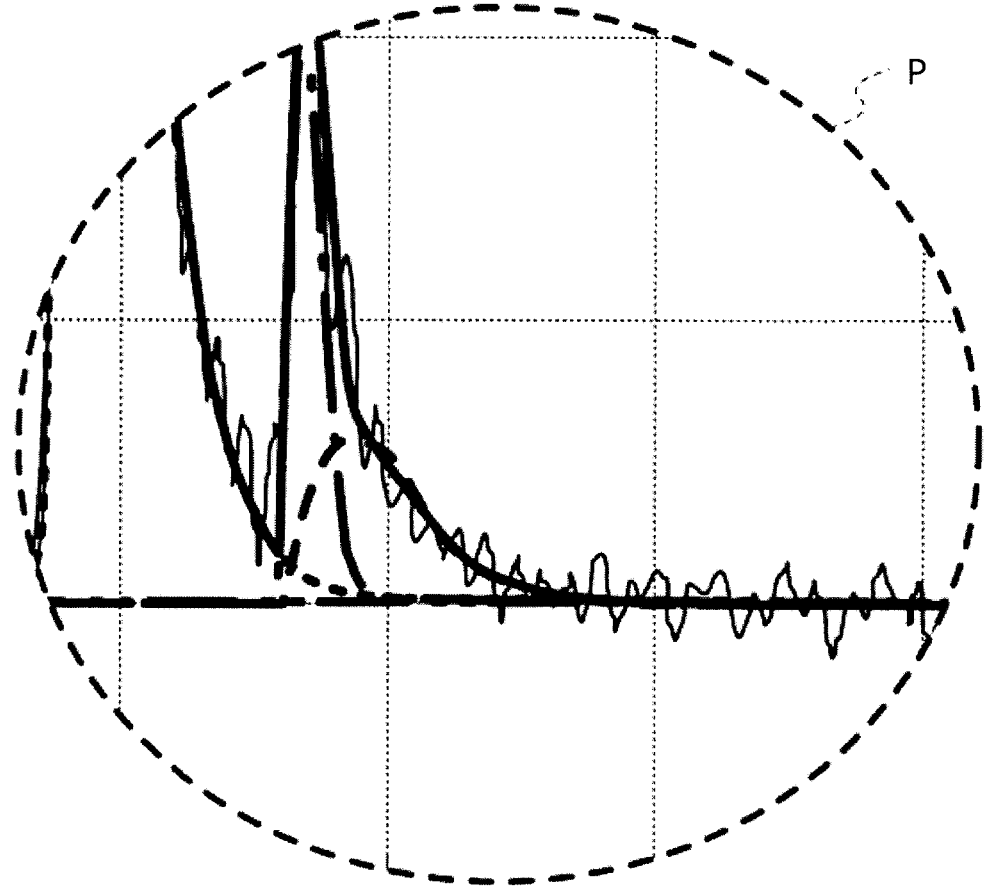
FIG. 6 is an enlarged view of P portion in FIG. 5.

FIG. 5 is a graph of an identification result according to the embodiment, and FIG. 6 is an enlarged view of P portion in FIG. 5. FIG. 5 illustrates combustion waveforms each indicating a relationship between crank angle and rate of heat release, where the horizontal axis indicates the crank angle and the vertical axis indicates the rate of heat release. The combustion waveforms include the combustion waveform for pre-combustion, the combustion waveform for the main combustion, and the combustion waveform for the first combustion of the after-combustion, the combustion waveform for the second combustion of the after-combustion, and the composite waveform of those combustion waveforms. These combustion waveforms are each a combustion waveform depending on an operating condition of an internal-combustion engine, and are based on calculated values of a Wiebe function using the parameters obtained by the above-described identification method according to the embodiment. Also, FIG. 6 additionally illustrates a combustion waveform based on experimental values. The combustion waveform based on experimental values is a combustion waveform for the entire combustion, and corresponds to the composite waveform.

As illustrated in FIGS. 5 and 6, according to the embodiment, the composite waveform based on calculated values obtained using the parameters substantially matches the combustion waveform based on experimental values. In addition, as illustrated in FIG. 6, the waveform for the first combustion of the after-combustion and the waveform for the second combustion of the after-combustion have a similar shape to the combustion waveforms illustrated in FIG. 3. Specifically, similarly to the combustion waveform illustrated in FIG. 3, the waveform for the first combustion of the after-combustion is a sharp waveform, and the waveform for the second combustion of the after-combustion is a gentle combustion waveform (spreading waveform) because of the representation the latter half of the combustion. In this manner, according to the embodiment, it is possible to identify the parameters so that the combustion waveforms for the first combustion and the second combustion of the after-combustion correspond to the characteristics of an actual combustion waveform.

Figure 7A:
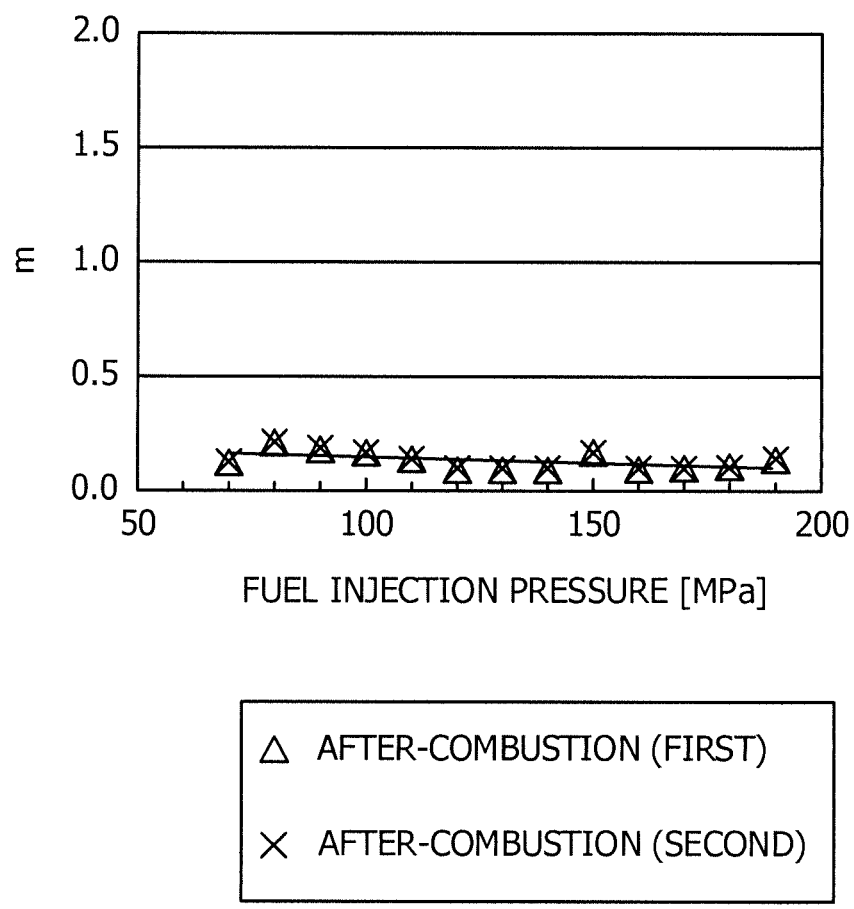
FIG. 7A is a graph illustrating an identification result according to the embodiment when a fuel injection pressure is changed.
Figure 7C:
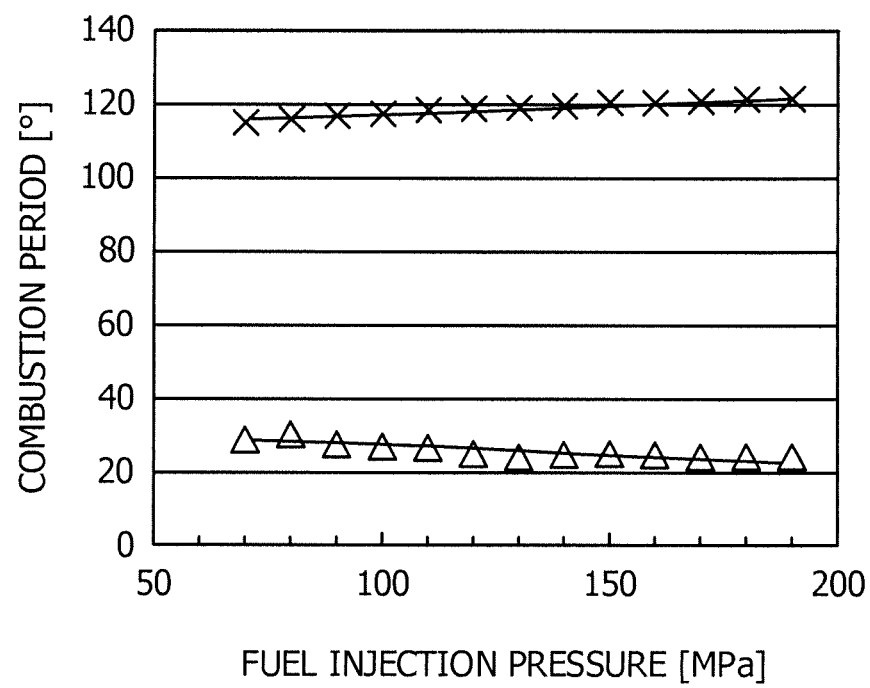
FIG. 7C is a graph illustrating an identification result according to the embodiment when a fuel injection pressure is changed.
Figure 8A:
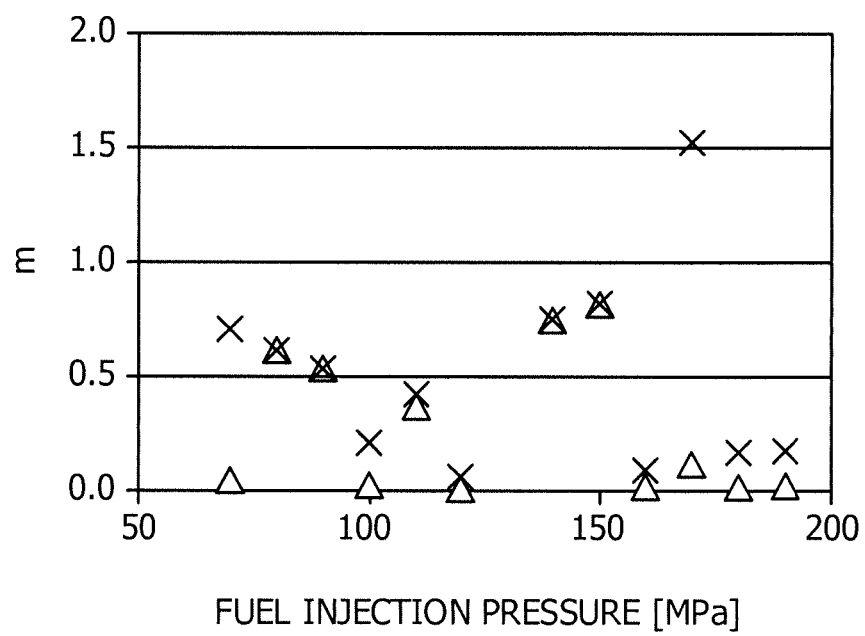
FIG. 8A is a graph illustrating an identification result according to a comparative example when a fuel injection pressure is changed.
Figure 8B:
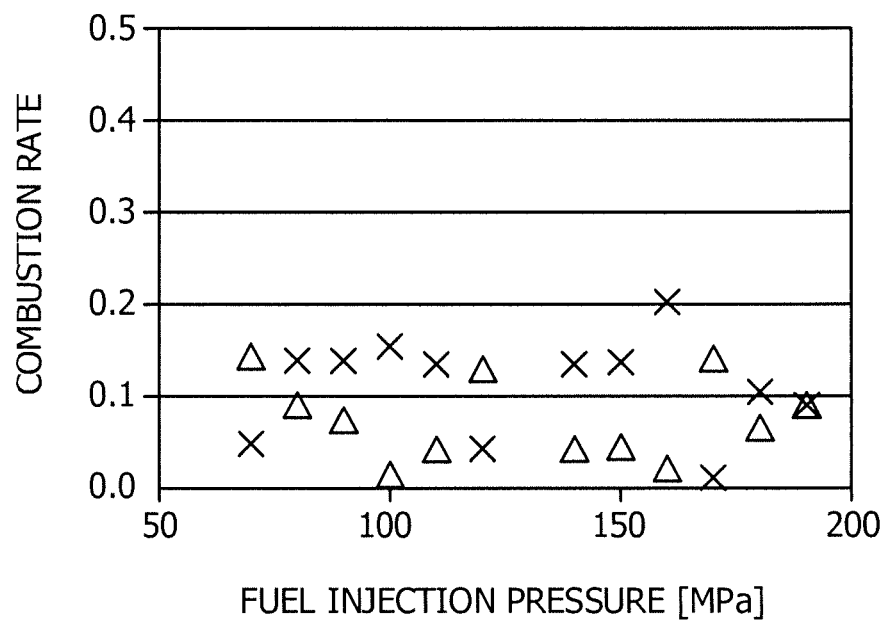
FIG. 8B is a graph illustrating an identification result according to a comparative example when the fuel injection pressure is changed.
Figure 8C:
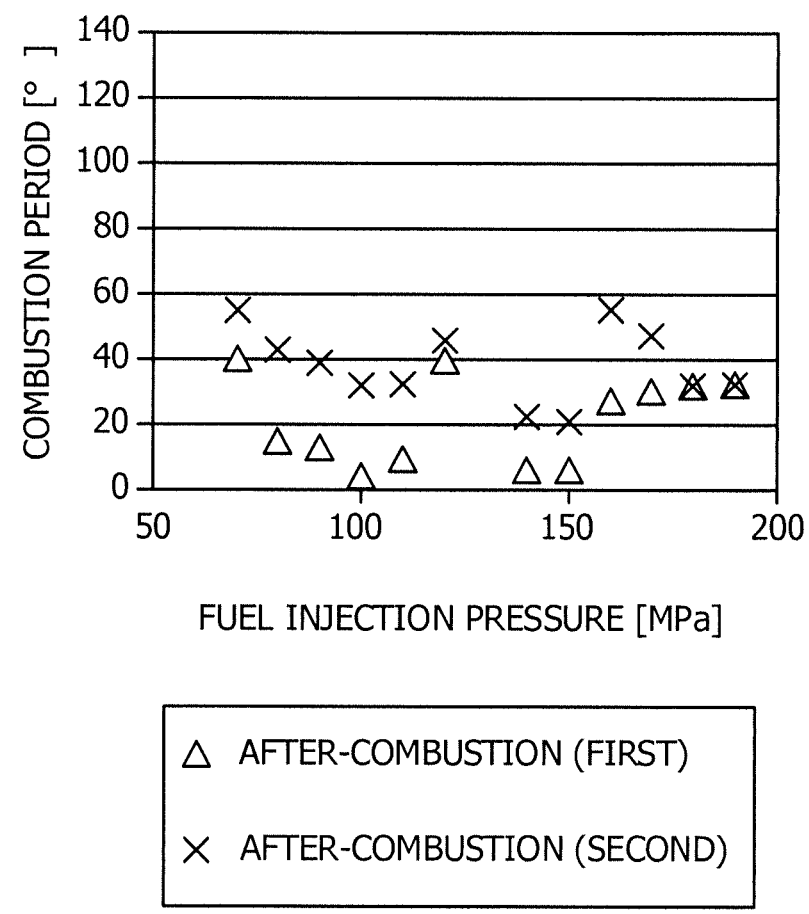
FIG. 8C is a graph illustrating an identification result according to a comparative example when the fuel injection pressure is changed.

FIGS. 7A to FIG. 7C are graphs each illustrating an identification result according to the embodiment when a fuel injection pressure (an example of an element of the operating condition of an internal-combustion engine) is changed. FIGS. 8A to FIG. 8C are graphs each illustrating an identification result according to a comparative example when the fuel injection pressure is changed. FIGS. 7A and 8A each illustrate an identification result of the value of the shape index m, where the horizontal axis indicates fuel injection pressure and the vertical axis indicates the identified value (m value) of the shape index m. FIGS. 7B and 8B each illustrate an identification result of the value of the combustion rate xf, where the horizontal axis indicates fuel injection pressure and the vertical axis indicates the identified value of the combustion rate xf. FIGS. 7C and 8C each illustrate an identification result of the value of the combustion period $\Delta\theta$, where the horizontal axis indicates fuel injection pressure and the vertical axis indicates the value of the identified combustion period $\Delta\theta$.

As illustrated in FIG. 8A, in the comparative example, the relationship between the fuel injection pressure and the m value is not linear or may not be approximated by a polynomial. In short, there is essentially no relationship between the fuel injection pressure and the m value. The same goes with other parameters as illustrated in FIGS. 8B and 8C. Like this, in the comparative example, each parameter varies with fuel injection pressure, which indicates that role-sharing between the first combustion and the second combustion of the after-combustion is not achieved. That is, as described above with reference to FIGS. 4B to 4D, with the identification method according to the comparative example, the Wiebe functions corresponding to both combustion are not capable of modeling corresponding combustion configurations with high accuracy depending on the operating conditions of an internal-combustion engine. This result demonstrates that it is difficult to explain the relationship between the fuel injection pressure and the parameters.

In contrast, in the embodiment, the relationship between the fuel injection pressure and the m value is linear as illustrated in FIG. 7A. In short, there is a substantial relationship between the fuel injection pressure and the m value. The same goes with other parameters as illustrated in FIGS. 7B and 7C. Like this, in the embodiment, for each parameter, the variation in the fuel injection pressure is reduced, and a result indicating a relationship between the operating condition and the parameters is obtained. Consequently, in the embodiment, it is possible to estimate the parameter values of each Wiebe function under a target operating condition. That is, the operating conditions of an internal-combustion engine are greatly diverse due to a combination of a combustion start time, the number of revolution of an engine, an amount of air (load factor), and a fuel injection pressure. In the embodiment, it is possible to identify the parameter values of each Wiebe function in a state which allows the rate of heat release to be estimated with high accuracy in such various operating conditions.

Next, a Wiebe function parameter identification device using the identification method according to the embodiment will be described. Hereinafter, each parameters of the Wiebe function described above is also referred to as a "model parameter" for the sake of differentiation.

Figure 9:
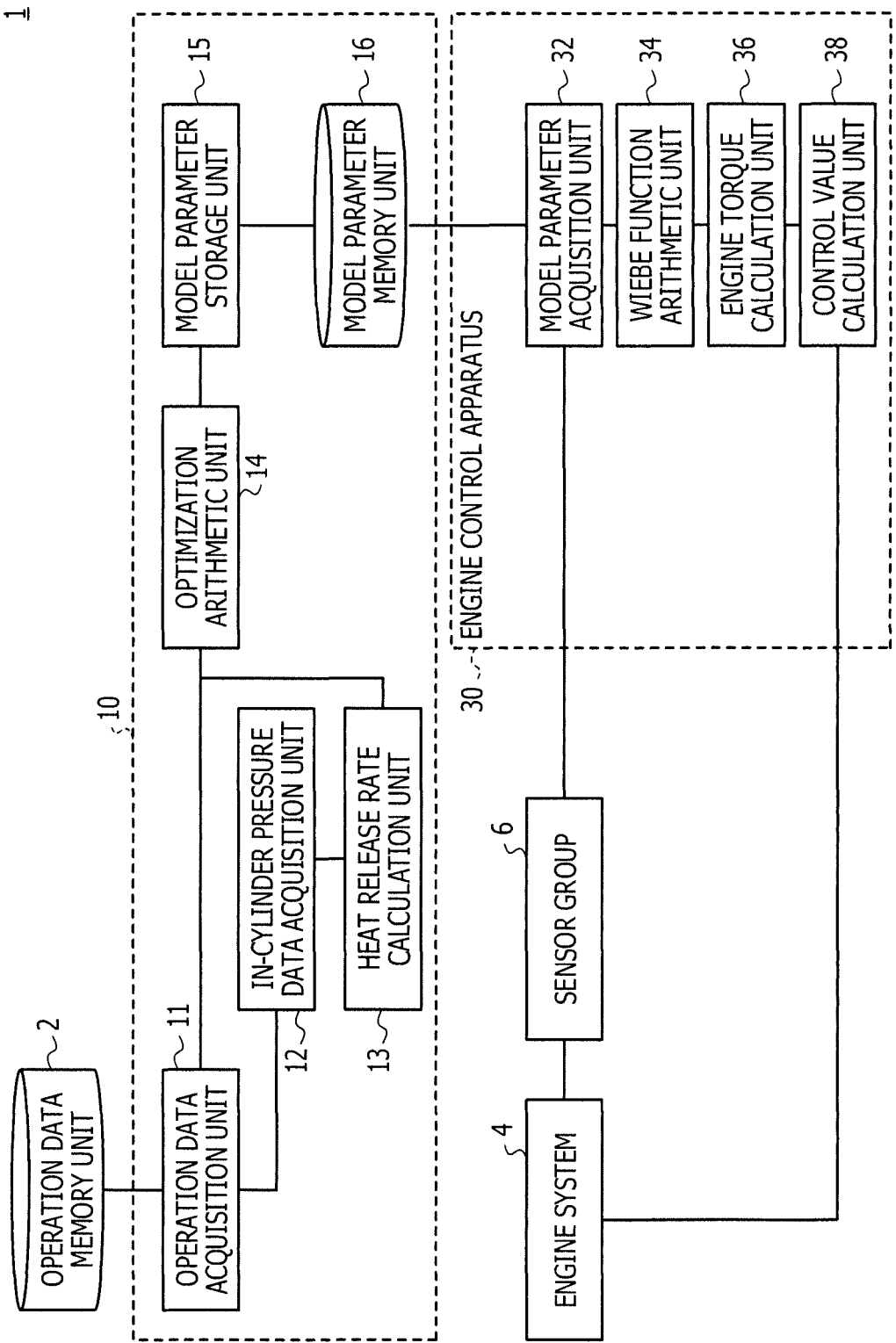
FIG. 9 is a diagram illustrating an example in-vehicle control system including a Wiebe function parameter identification device.

FIG. 9 is a diagram illustrating an example in-vehicle control system 1 including the Wiebe function parameter identification device. FIG. 9 additionally illustrates an operation data memory unit 2 in addition to the in-vehicle control system 1.

The operation data memory unit 2 stores operation data which is obtained when an engine system 4 is in operation. It is to be noted that the operation data does not have to be data for the engine system 4 itself, and may be data for the same engine system including an internal-combustion engine of the same type. The operation data provides the values obtained when the engine system 4 is in operation, and includes the values of predetermined parameters (hereinafter referred to as the "operating condition parameters") indicating the operating condition of an internal-combustion engine, and data of the in-cylinder pressure. The operation data is obtainable, for instance, by a bench test using engine dynamometer equipment. The operating condition parameters are parameters that effect to the optimal values of model parameters. In other words, when the values of the operating condition parameters change, the optimal values of model parameters change. Cylinder internal pressure data is, for instance, a set of values of in-cylinder pressure for each crank angle. For instance, an example of operation data is illustrated in FIG. 10. In the example illustrated in FIG. 10, the operating condition parameters include the number of revolution of an engine, a fuel injection amount, a fuel injection pressure, and an oxygen concentration, and the fuel injection amount is a value for each injection (pilot injection, pre-injection in the example illustrated in FIG. 10). In the example illustrated in FIG. 10, for each operating condition identification (ID), the values of the operating condition parameters, and the in-cylinder pressure data are stored in association with the operating condition ID.

The in-vehicle control system 1 illustrated in FIG. 9 is mounted in a vehicle. The vehicle uses an internal-combustion engine as the power source, and includes a hybrid vehicle that uses an internal-combustion engine and an electric motor as the power source. The type of internal-combustion engine may be any type, and the internal-combustion engine may be a diesel engine or a gasoline engine. Also, the method of injecting fuel of a gasoline engine may be any method, and a port injection method, an in-cylinder injection method, or a combination of these.

The in-vehicle control system 1 includes the engine system 4, a sensor group 6, a parameter identification device 10, and an engine control device 30.

The engine system 4 may include various actuators (such as an injector, and an electronic throttle) and various members (such as an intake path, and a catalyst) which are provided in an internal-combustion engine.

The sensor group 6 may include various sensors (such as a crank angle sensor, an air flow meter, an intake pressure sensor, and an air-fuel ratio sensor) provided in an internal-combustion engine. It is to be noted that the sensor group 6 does not have to include an in-cylinder pressure sensor. From the viewpoint of cost, durability, and maintainability, it is disadvantageous to install an in-cylinder pressure sensor.

The parameter identification device 10 identifies the model parameters (parameters of each Wiebe function) by the identification method according to the embodiment described above based on the operation data in the operation data memory unit 2.

Figure 11:
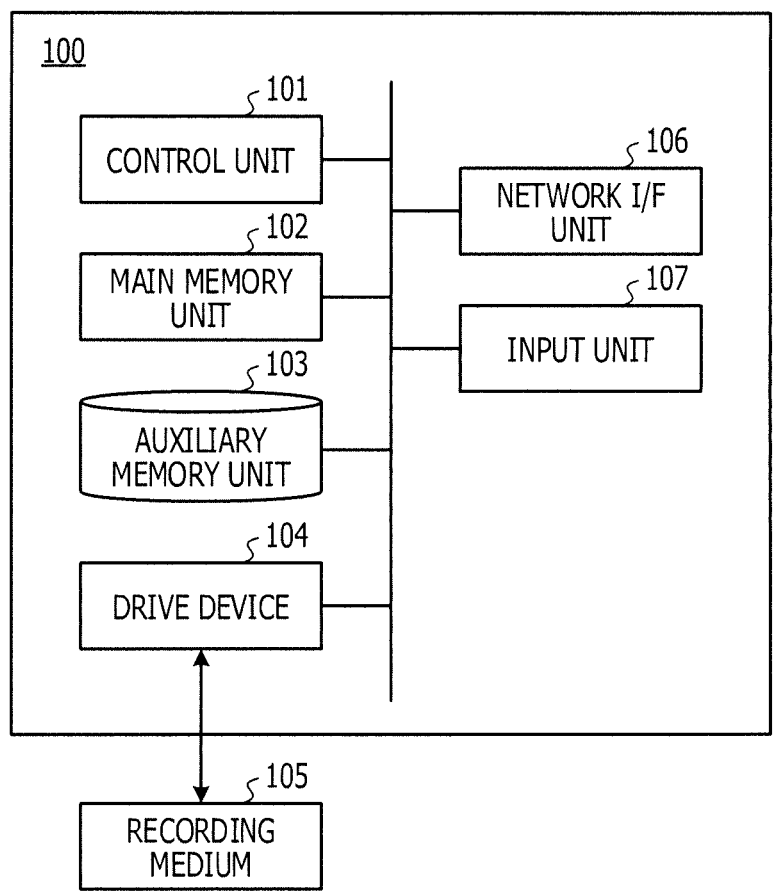
FIG. 11 is a diagram illustrating an example hardware configuration of the parameter identification device.

FIG. 11 is a diagram illustrating an example hardware configuration of the parameter identification device 10.

In the example illustrated in FIG. 11, the parameter identification device 10 includes a controller 101, a main memory unit 102, an auxiliary memory unit 103, a drive device 104, a network I/F unit 106, and an input unit 107.

The controller 101 is an arithmetic device that executes programs stored in the main memory unit 102 and the auxiliary memory unit 103, and receives data from the input unit 107 and a storage device, calculates and processes the data, and outputs a result to the storage device.

The main memory unit 102 is, for instance, a read only memory (ROM) or a random access memory (RAM). The main memory unit 102 is a storage device that stores or temporarily stores an operating system (OS), which is base software, to be executed by the controller 101, a program such as application software, and data.

The auxiliary memory unit 103 is, for instance, a hard disk drive (HDD), and is a storage device that stores data related to application software.

The drive device 104 reads a program from a recording medium 105, for instance, a flexible disk, and installs the program in a storage device.

The recording medium 105 stores predetermined programs. The programs stored in the recording medium 105 are installed in the parameter identification device 10 via the drive device 104. The installed predetermined programs are executable by the parameter identification device 10.

The network I/F unit 106 is an interface between peripheral equipment having a communication function and the parameter identification device 10, the peripheral equipment being coupled via a network constructed by a data transmission line such as a wired and/or wireless line.

The input unit 107 has a keyboard including a cursor key, numerical input and various function keys, a mouse, and a touchpad.

It is to be noted that in the example illustrated in FIG. 11, various types of processing described below may be implemented by causing the parameter identification device 10 to execute a program. In addition, various types of processing described below may also be implemented by recording a program on the recording medium 105, and causing the parameter identification device 10 to read the program. It is to be noted that various types of recording media may be used as the recording medium 105. For instance, the recording medium 105 may be a recording medium which records information optically, electrically or magnetically, such as a compact disc (CD)-ROM, a flexible disk, and a magneto-optical disk, or a semiconductor memory which records information electrically, such as a ROM, and a flash memory. It is to be noted that carrier waves are not included in the recording medium 105.

FIG. 9 is referred to again. The parameter identification device 10 includes an operation data acquisition unit 11, an in-cylinder pressure data acquisition unit 12, a heat release rate calculation unit 13, an optimization calculation unit 14, a model parameter storage unit 15, and a model parameter memory unit 16. These units will be described later. The operation data acquisition unit 11, the in-cylinder pressure data acquisition unit 12, the heat release rate calculation unit 13, the optimization arithmetic unit 14, and the model parameter storage unit 15 may be implemented by the controller 101 illustrated in FIG. 11 executing at least one program in the main memory unit 102, for instance. Also, the model parameter memory unit 16 may be implemented by the auxiliary memory unit 103 illustrated in FIG. 11, for instance.

The engine control device 30 controls various actuators of the engine system 4. The engine control device 30 includes a model parameter acquisition unit 32, a Wiebe function arithmetic unit 34, an engine torque calculation unit 36, and a control value calculation unit 38. These units will be described later. The hardware configuration of the engine control device 30 may be the same as the hardware configuration of the parameter identification device 10 illustrated in FIG. 11.

Figure 12:
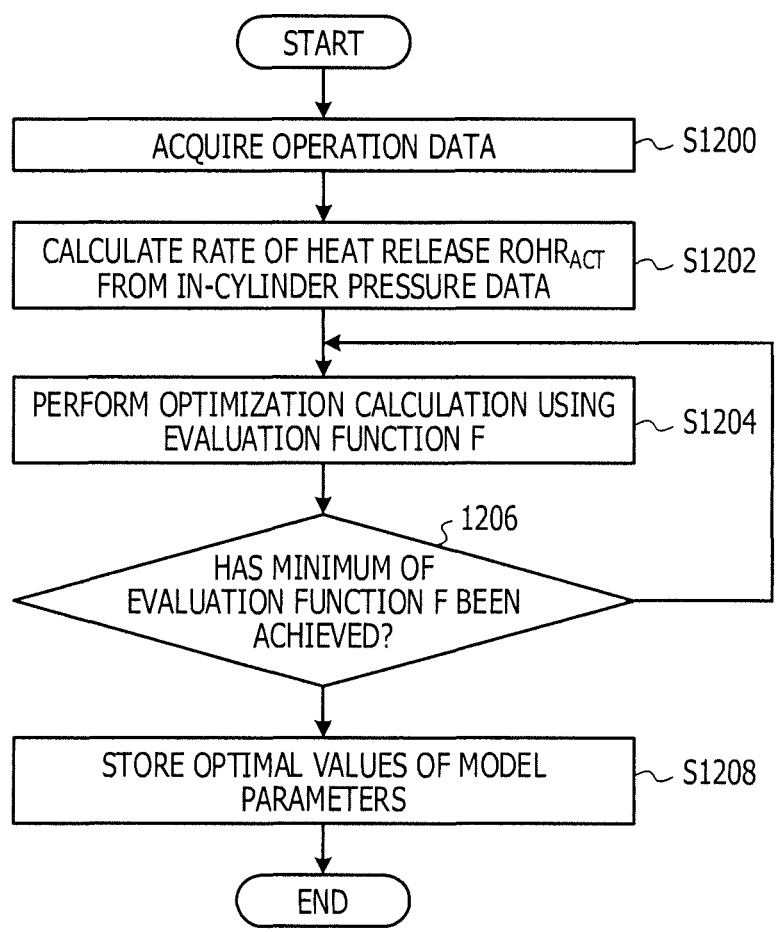
FIG. 12 is a flowchart illustrating example processing performed by the parameter identification device.

FIG. 12 is a flowchart illustrating example processing performed by the parameter identification device 10. The processing illustrated in FIG. 12 is performed off-line, for instance. Also, the processing illustrated in FIG. 12 is performed under each of multiple operating conditions, for instance, for operation data related to the multiple operating conditions in the operation data memory unit 2. It is to be noted that each operating condition is specified by a combination of the values of the operating condition parameters described above. Here, as an example, for each operating condition ID of the operation data illustrated in FIG. 10, the processing illustrated in FIG. 12 is to be performed for the operation data associated with the operating condition ID.

In step S1200, the operation data acquisition unit 11 acquires operation data associated with a certain operating condition (operating condition ID) from the operation data memory unit 2. It is to be noted that as described above, the operation data includes the values of the operating condition parameters, and the in-cylinder pressure data for each operating condition ID.

In step S1202, the in-cylinder pressure data acquisition unit 12 acquires the in-cylinder pressure data among the operation data acquired in step S1200, and the heat release rate calculation unit 13 calculates the rate of heat release $ROHR_{act}$ for each crank angle based on the in-cylinder pressure data. The rate of heat release $ROHR_{act}$ may be calculated, for instance, by using the following expression.

$$\frac{dQ}{d\theta} = \frac{\kappa}{\kappa-1} P \cdot \frac{dV}{d\theta} + \frac{1}{\kappa-1} V \cdot \frac{dP}{d\theta} \quad \text{[Math 11]}$$

Here, Q is the amount of heat release, $\kappa$ is a specific heat ratio, P is an in-cylinder pressure, and V is a cylinder internal volume. For instance, a known value, which is determined based on the composition of combustion gas, may be used as the value of $\kappa$. A value based on the in-cylinder pressure data is used as the value of P. A value geometrically determined according to the crank angle $\theta$ may be used as the value of each of the cylinder internal volume V, and its change rate $dV/d\theta$.

In step S1204, the optimization arithmetic unit 14 performs optimization calculation using the evaluation function F (see Math 5) based on the rate of heat release $ROHR_{act}$ obtained in step S1202. Specifically, in step S1204 and step S1206, the optimization arithmetic unit 14 searches for the values (optimal values) of the model parameters which minimize the valuation function F while changing the value of each model parameter. When the values of the model parameters which minimize the valuation function F are obtained, the flow proceeds to step S1208.

In step S1208, the model parameter storage unit 15 stores the optimal value of each model parameter obtained in step S1204 and step S1206 in the model parameter memory unit 16 in association with an operating condition ID. In this manner, the optimal value of each model parameter is calculated for each operating condition (operating condition ID), and stored in the model parameter memory unit 16.

Figure 13:
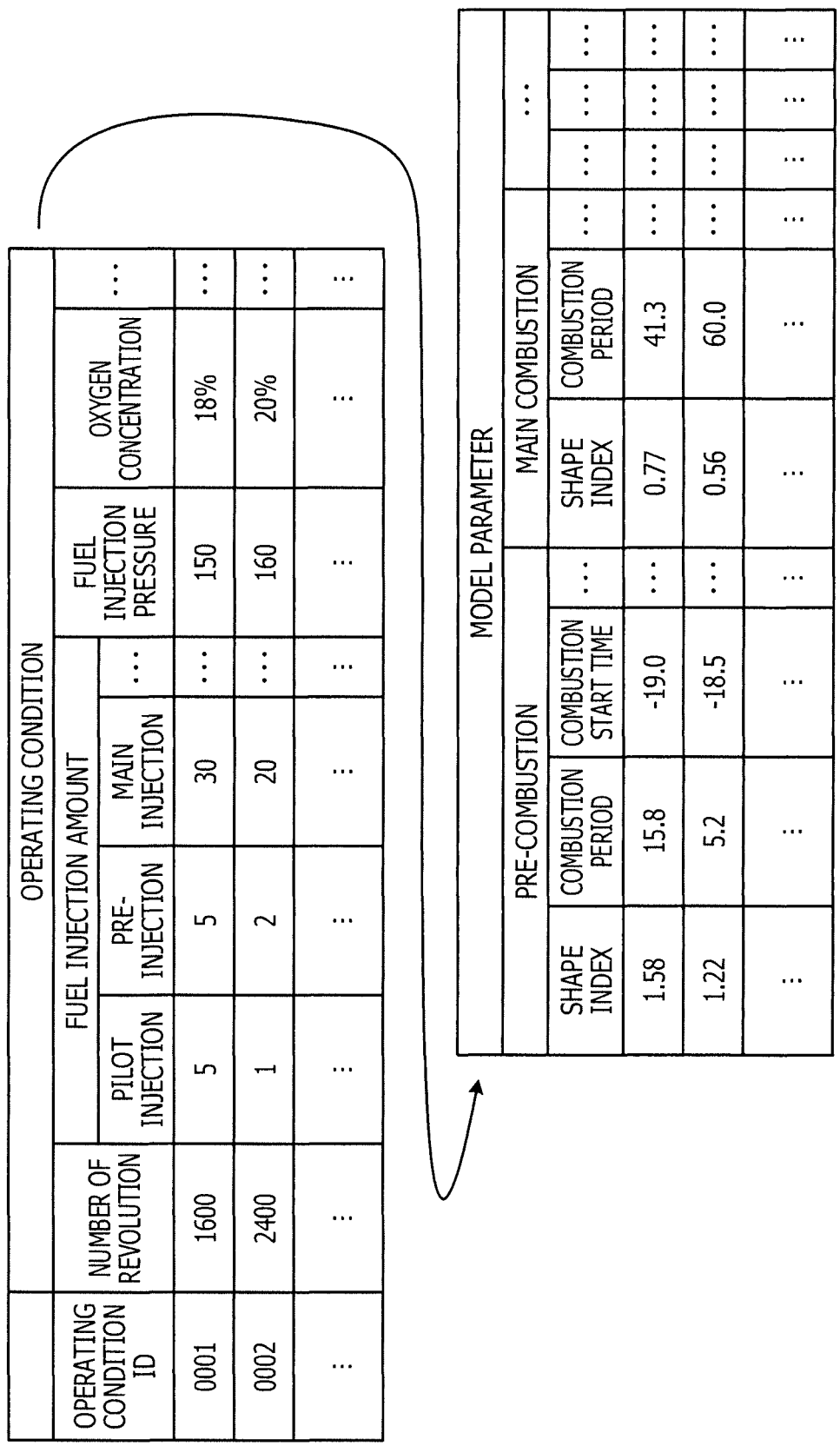
FIG. 13 is a table conceptually illustrating example data in a model parameter memory unit.

FIG. 13 is a table conceptually illustrating example data in the model parameter memory unit 16. In the example illustrated in FIG. 13, the data (operating condition parameters) illustrated in FIG. 10 is associated with the optimal value of each model parameter. In the example illustrated in FIG. 13, the optimal value of each model parameter is determined for each of Wiebe functions (for each of combustion configurations such as pre-combustion, and the main combustion).

Here, as described above, in the data in the model parameter memory unit 16, each operating condition (each combination of the operating condition parameters) is associated with the optimal value of each model parameter. Therefore, when the data for a large number of operating conditions are obtained, for any operating condition, it is highly probable that the values of model parameters adapted to the operating condition are retrievable. However, the operating conditions of an internal-combustion engine are greatly diverse due to a combination of the number of revolution of an engine, an amount of air, and a fuel injection pressure. It is not practical to derive the optimal value of each model parameter in such various operating conditions.

Thus, the model parameter storage unit 15 may calculate a function (for instance, a first degree polynomial) indicating the relationship between the optimal value of each model parameter and each operating condition based on the data in the model parameter memory unit 16. In this case, the model parameter storage unit 15 records information on the function (for instance, the values of coefficient $\beta_1$ to $\beta_n$ described below) instead of the data illustrated in FIG. 13. In this case, a storage capacity used for the model parameter memory unit 16 may be significantly reduced.

For instance, the model parameter storage unit 15 may approximate the relationship between the optimal value of each model parameter and each operating condition based on the data in the model parameter memory unit 16 using the first degree polynomial below.

$$y_j = \beta_0 + \beta_1 \cdot xe_1 + \beta_2 \cdot xe_2 + \ldots \beta_n \cdot xe_n \ (j=1, 2, \ldots) \quad \text{[Math 12]}$$

Here, $\beta_0$ is an intercept, $\beta_1$ to $\beta_n$ are coefficients, and $xe_1$ to $xe_n$ are operating condition parameters (explanatory variables). n corresponds to the number of explanatory variables. $y_j$ is the value of each model parameter, and the polynomial of Math 12 is used for each model parameter.

Similarly to the method used for regression analysis, a least square method may be used as the estimation method for $\beta_0$, $\beta_1$ to $\beta_n$. In this case, let $y_j$ be an objective variable, and the values of $\beta_0$, $\beta_1$ to $\beta_n$ may be determined to minimize the mean square of the difference between a measured value of the objective variable and an estimated value of the objective variable by the expression of Math 12. In this manner, when the number of model parameters is 16 (j=16), the values of $\beta_0$, $\beta_1$ to $\beta_n$ for 16 sets are calculated. For instance, a combustion period $y_2$ for the pre-combustion is as follows.

$$y_2 = 0.744 + 0.589 \cdot xe_1 + 0.012 \cdot xe_2 + \ldots + 0.029 \cdot xe_n \quad \text{[Math 13]}$$

Here, as described above with reference to FIGS. 7A to 7C, according to the embodiment, for each model parameter, the variation in the fuel injection pressure is reduced, and a result indicating a relationship between the operating condition and the model parameters is obtained. That is, when a fuel injection pressure is set as a variable, and the rest parameters are fixed, a linear relationship with a variable of the fuel injection pressure is obtained, and as illustrated in FIGS. 7A to 7C, an estimated result of each model parameter lies on a line. In this manner, according to the embodiment, a relationship between the operating condition and the model parameters is maintained in various operating conditions, and thus the relationship may be expressed by a function such as a polynomial. Consequently, it is possible to estimate the value of each model parameter corresponding to any operating condition with high accuracy.

It is to be noted that although the expression of Math 12 is a first degree polynomial, another polynomial such as a second degree polynomial may be used.

Figure 14:
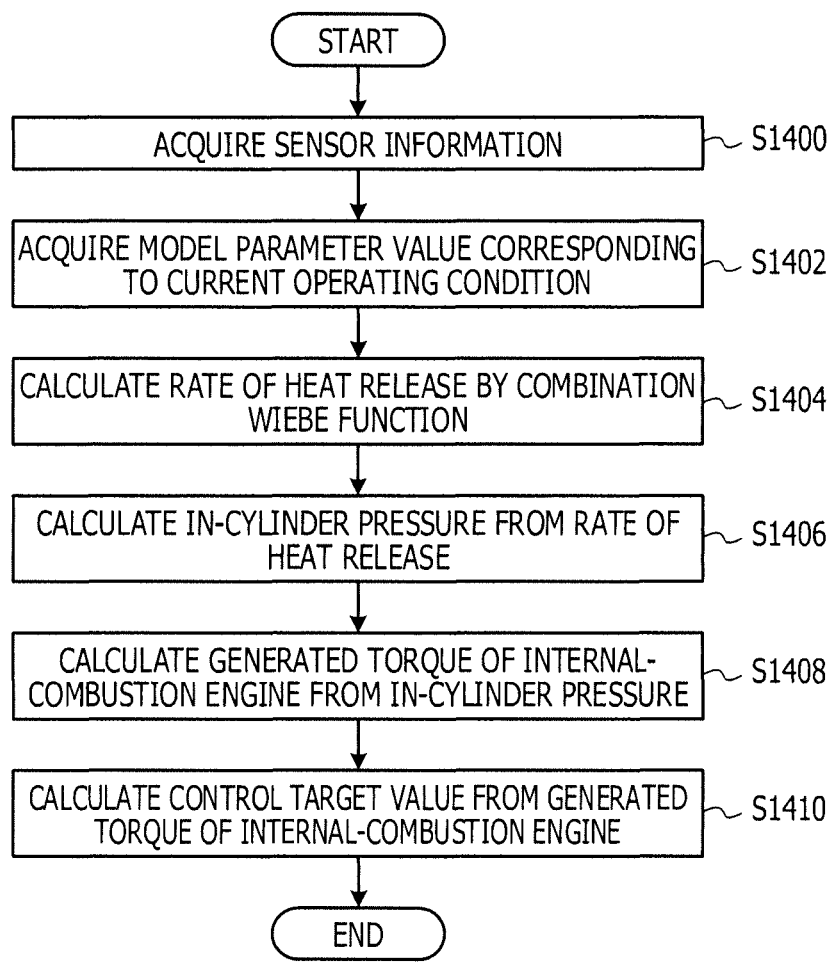
FIG. 14 is a flowchart illustrating example processing performed by an engine control device.

FIG. 14 is a flowchart illustrating example processing performed by the engine control device 30. The processing illustrated in FIG. 14 is performed, for instance, when the engine system 4 is in operation.

In step S1400, the model parameter acquisition unit 32 acquires sensor information from the sensor group 6, the sensor information indicating a state of the current internal combustion engine. The information indicating the state of the current internal combustion engine is, for instance, the values of the current operating condition parameters (information indicating the operating conditions of the current internal-combustion engine), and the current crank angle.

In step S1402, the model parameter acquisition unit 32 acquires the value of each model parameter corresponding to the current operating condition from the model parameter memory unit 16. For instance, when the function expressed by Math 12 described above is stored in the model parameter memory unit 16, the model parameter acquisition unit 32 acquires the value of each model parameter by substituting the value of each of the current operating condition parameters into a function corresponding to the model parameter.

In step S1404, the Wiebe function arithmetic unit 34 calculates the current rate of heat release based on the value of each model parameter obtained in step S1402. The rate of heat release may be derived using the combination Wiebe function (expression illustrated in Math 4) which is modeled with the value of each model parameter obtained in step S1402.

In step S1406, the engine torque calculation unit 36 calculates the current in-cylinder pressure based on the calculated value of the current rate of heat release obtained in step S1404. As described above, calculation of the in-cylinder pressure may be achieved by using the relational expression indicated by Math 11.

In step S1408, the engine torque calculation unit 36 calculates a generated torque of the current internal-combustion engine based on the calculated value of the in-cylinder pressure obtained in step S1406. The generated torque of the internal-combustion engine may be calculated as the sum of a torque due to the in-cylinder pressure and an inertia torque.

In step S1410 the control value calculation unit 38 calculates a control target value to be given to the engine system 4, based on the calculated value of the generated torque of the current internal-combustion engine obtained in step S1408. For instance, the control value calculation unit 38 may determine a control target value so as to achieve a requested drive torque based on the difference between the requested drive torque and the calculated value of the generated torque of the current internal-combustion engine obtained in step S1408. The control target value may be, for instance, a target value of the throttle opening or a target value of the fuel injection amount. The requested drive torque may be a driver requested drive torque according to a vehicle speed and an accelerator opening, or a requested drive torque for supporting the operation of the vehicle by a driver. The requested drive torque for supporting the operation of the vehicle by a driver is determined based on, for instance, the information from a radar sensor or the like. The requested drive torque for supporting the operation of the vehicle by a driver may be, for instance, a drive torque desired in order for the vehicle to run at a predetermined vehicle speed, a drive torque desired in order for the vehicle to follow a preceding vehicle, or a drive torque desired in order to limit the vehicle speed not to exceed a speed limit.

With the processing illustrated in FIG. 14, it is possible to perform feedback control on the engine system 4 based on the difference between a requested driving force and the calculated value of the generated torque of an internal-combustion engine based on the combination Wiebe function. As described above, the accuracy of a calculated value of the generated torque of an internal-combustion engine based on the combination Wiebe function is high because the identification accuracy of each model parameter of the combination Wiebe function is high. Thus, the engine system 4 is controllable with high accuracy using a highly accurate calculated value of the generated torque of an internal-combustion engine. Consequently, for instance, fuel does not have to be excessively injected into a cylinder, and thus the engine performance is enhanced and the fuel efficiency and drivability are improved. In this manner, it is possible to effectively utilize the data obtained by the parameter identification device 10 (data in the model parameter memory unit 16) for higher performance of the engine control system.

Although the engine control device 30 illustrated in FIG. 9 is mounted in the in-vehicle control system 1 along with all the components of the parameter identification device 10, the engine control device 30 may be mounted in the in-vehicle control system 1 along with the model parameter memory unit 16 of the parameter identification device 10. In other words, the in-vehicle control system 1 may not include the components other than the model parameter memory unit 16 among the components of the parameter identification device 10. In this case, it is sufficient that the above-described data be stored in the model parameter memory unit 16 in advance (before shipment from a factory).

Figure 15:
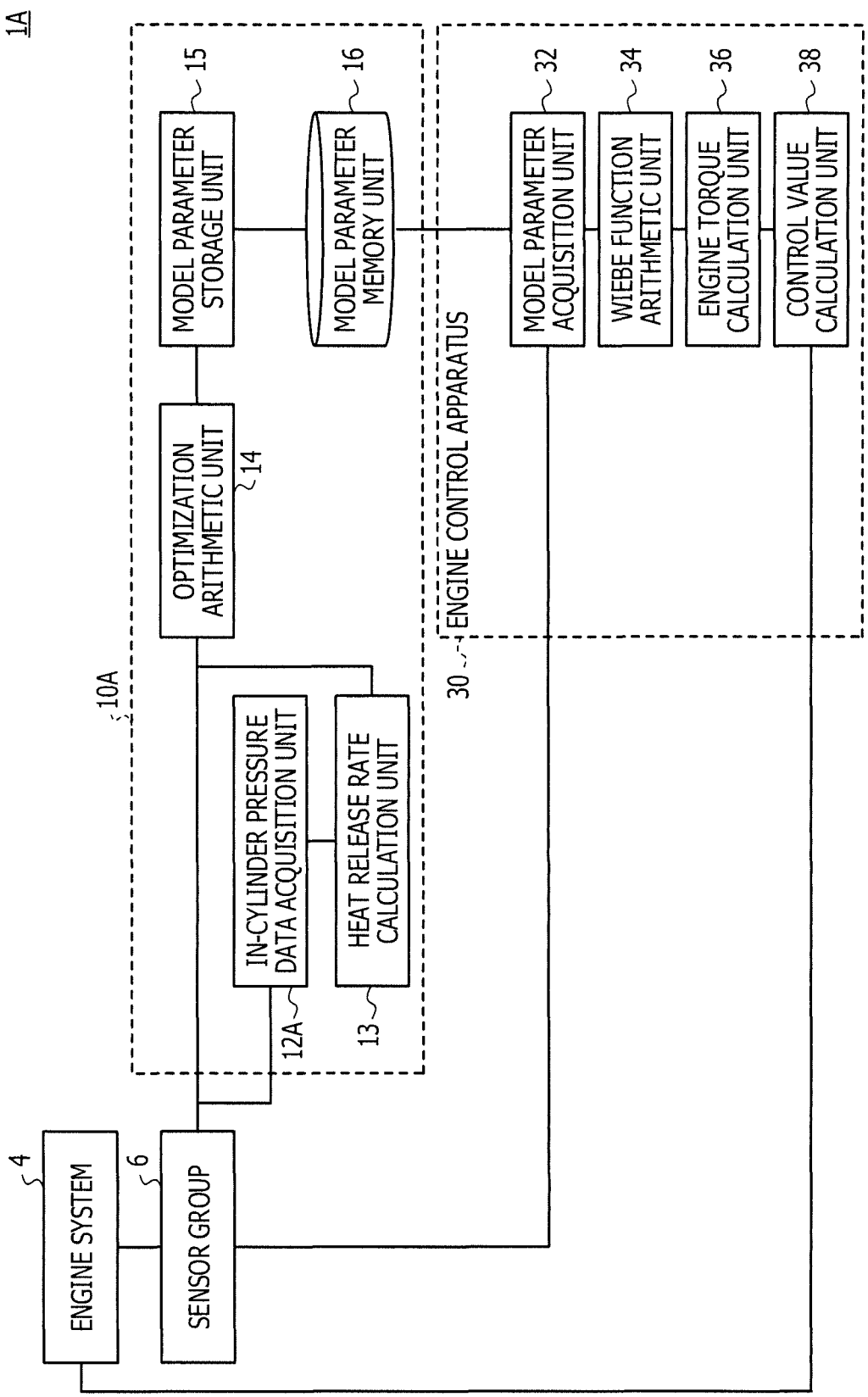
FIG. 15 is a diagram illustrating another example in-vehicle control system including the Wiebe function parameter identification device.

FIG. 15 is a diagram illustrating another example in-vehicle control system including the Wiebe function parameter identification device.

An in-vehicle control system 1A illustrated in FIG. 15 differs from the in-vehicle control system 1 illustrated in FIG. 9 in that the operation data acquisition unit 11 is omitted. In addition, the in-vehicle control system 1A illustrated in FIG. 15 differs from the in-vehicle control system 1 illustrated in FIG. 9 in that the parameter identification device 10 is replaced by a parameter identification device 10A, and the sensor group 6 is replaced by a sensor group 6A. Of the components of the in-vehicle control system 1A illustrated in FIG. 15, those components which may be the same as the components of the in-vehicle control system 1 illustrated in FIG. 9 are labeled with the same symbol in FIG. 15, and a description is omitted.

The sensor group 6A is different from the above-described sensor group 6 in that the sensor group 6A has to include an in-cylinder pressure sensor, whereas the group 6 does not have to include an in-cylinder pressure sensor.

The parameter identification device 10A differs from the parameter identification device 10 in that the in-cylinder pressure data acquisition unit 12 is replaced by an in-cylinder pressure data acquisition unit 12A. Although the data itself acquired by the in-cylinder pressure data acquisition unit 12A is the same as the data acquired by the in-cylinder pressure data acquisition unit 12, the in-cylinder pressure data acquisition unit 12A differs from the in-cylinder pressure data acquisition unit 12 in that the in-cylinder pressure data acquisition unit 12A acquires the data from the sensor group 6A (in-cylinder pressure sensor), whereas the in-cylinder pressure data acquisition unit 12 acquires the data from the operation data memory unit 2.

In the in-vehicle control system 1A illustrated in FIG. 15, the sensor group 6A includes an in-cylinder pressure sensor, and thus it is possible to perform the processing illustrated in FIG. 12 even in a vehicle mounted state (that is, the state of a vehicle after shipment). In other words, in the in-vehicle control system 1A illustrated in FIG. 15, it is possible to regularly or irregularly update the data in the model parameter memory unit 16 in a vehicle mounted state. Consequently, even when there is individual variability in the characteristics of an internal-combustion engine, it is possible to correct the model parameters according to the individual variability. Also, even when the characteristics of an internal-combustion engine change over time, it is possible to update the model parameters.

Next, a specific example of an identification method for various combustion waveforms will be described with reference to FIGS. 16 to 20.

Figure 16:
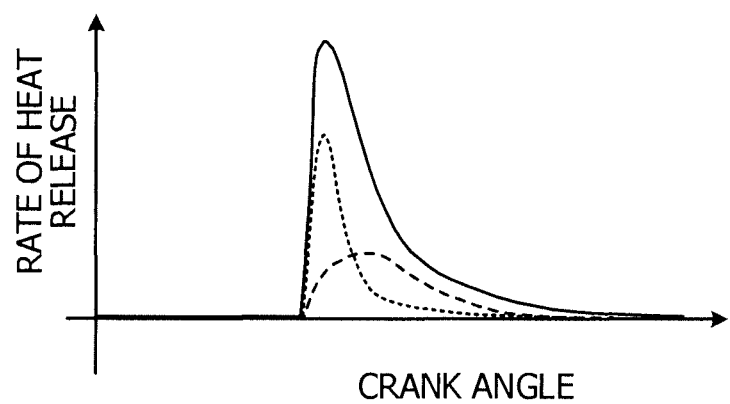
FIG. 16 is a graph of an example in which single-stage combustion is modeled by two Wiebe functions.

FIG. 16 illustrates an example of a combustion waveform in single-stage combustion. In the example illustrated in FIG. 16, the combustion waveform (composite waveform) in single-stage combustion may be understood as a composite of two combustion waveforms in different combustion configurations (specifically, a combustion waveform according to the first combustion configuration, and a combustion waveform according to the second combustion configuration). Therefore, a combination of two Wiebe functions is used in the example illustrated in FIG. 16. That is, the expression of Math 4 is rewritten as follows.

$$ROHR = \sum_{i=1}^{2} ROHR_i$$
$$= \sum_{i=1}^{2} Q_b \cdot xf_i \cdot a_i(m_i + 1) \cdot \frac{1}{\Delta\theta_i} \cdot \left[\frac{\theta - \theta_{soc_i}}{\Delta\theta_i}\right]^{m_i} \cdot$$
$$\exp\left\{-a_i \cdot \left[\frac{\theta - \theta_{soc_i}}{\Delta\theta_i}\right]^{m_i+1}\right\}$$

[Math 14]

It is to be noted that i=1 is for the first combustion configuration, and i=2 is for the second combustion configuration. In this case, the evaluation function F is, for instance, as follows.

$$F = \min(\Sigma(ROHR_{act} - ROHR_w)^2 - w_{a1}(m_1 - m_2)^2 - w_{b1}(\Delta\theta_1 - \Delta\theta_2)^2)$$ [Math 15]

Here, $w_{a1}$ and $w_{b1}$ are respective weighting values (weighting coefficients) for the second and third evaluation values. However, the weighting values may be omitted.

Figure 17:
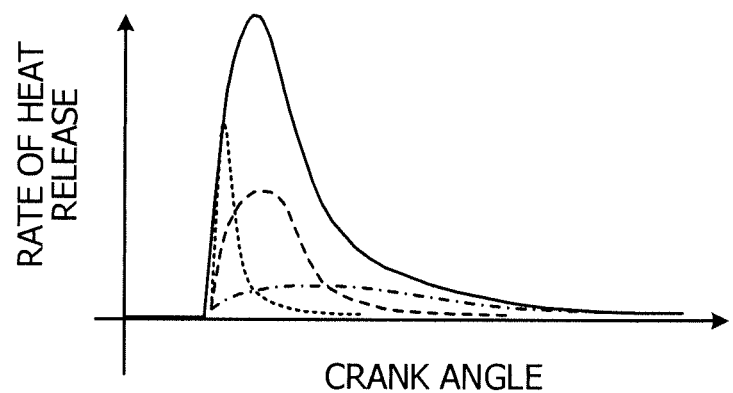
FIG. 17 is a graph of an example in which single-stage combustion is modeled by three Wiebe functions.

FIG. 17 illustrates an example of a combustion waveform in single-stage combustion. In the example illustrated in FIG. 17, the combustion waveform (composite waveform) in single-stage combustion may be understood as a composite of three combustion waveforms in different combustion configurations (specifically, a combustion waveform according to the first combustion configuration, a combustion waveform according to the second combustion configuration, and a combustion waveform according to the third combustion configuration). Therefore, a combination of three Wiebe functions is used in the example illustrated in FIG. 17. That is, the expression of Math 4 is rewritten as follows.

$$ROHR = \sum_{i=1}^{3} ROHR_i$$
$$= \sum_{i=1}^{3} Q_b \cdot xf_i \cdot a_i(m_i + 1) \cdot \frac{1}{\Delta\theta_i} \cdot \left[\frac{\theta - \theta_{soc_i}}{\Delta\theta_i}\right]^{m_i} \cdot$$
$$\exp\left\{-a_i \cdot \left[\frac{\theta - \theta_{soc_i}}{\Delta\theta_i}\right]^{m_i+1}\right\}$$

[Math 16]

It is to be noted that i=1 is for the first combustion configuration, i=2 is for the second combustion configuration, and i=3 is for the third combustion configuration. In this case, the evaluation function F is, for instance, as follows.

$$F = \min(\Sigma(ROHR_{act} - ROHR_w)^2 - w_{a1}(m_1 - m_2)^2 - w_{a2}(m_2 - m_3)^2 - w_{a3}(m_3 - m_1)^2 - w_{b1}(\Delta\theta_1 - \Delta\theta_2)^2 - w_{b2}(\Delta\theta_2 - \Delta\theta_3)^2 - w_{b3}(\Delta\theta_3 - \Delta\theta_1)^2)$$ [Math 17]

In this case, the second evaluation value and the third evaluation value are evaluated between any two (all possible combinations of two) of a Wiebe function according to the first combustion configuration, a Wiebe function according to the second combustion configuration, and a Wiebe function according to the third combustion configuration. Here, $w_{a1}$ and so on are weighting values for the second evaluation value, and $w_{b1}$ and so on are weighting values for the third evaluation value. The weighting values may be omitted.

Figure 18:
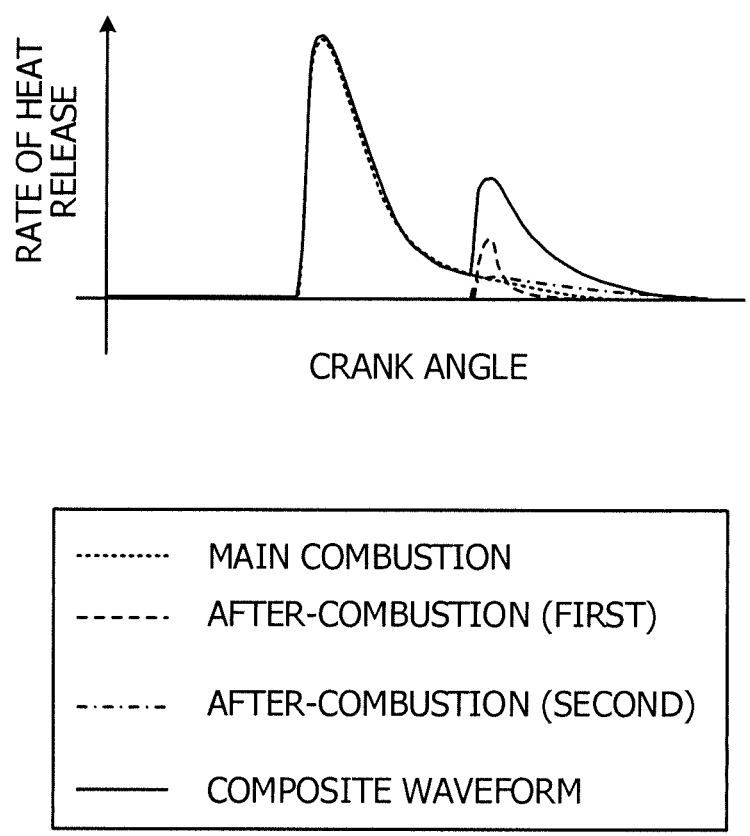
FIG. 18 is a graph of an example in which two-stage combustion is modeled by three Wiebe functions.

FIG. 18 illustrates an example of a combustion waveform in two-stage combustion. In the example illustrated in FIG. 18, the combustion waveform (composite waveform) in two-stage combustion may be understood as a composite of three combustion waveforms in different combustion configurations (specifically, a combustion waveform according to the first combustion configuration, a combustion waveform according to the second combustion configuration, and a combustion waveform according to the third combustion configuration). Therefore, a combination of three Wiebe functions is used in the example illustrated in FIG. 18. That is, the expression of Math 4 is rewritten to Math 16. In this case, the evaluation function F is, for instance, as follows.

$$F = \min(\Sigma(ROHR_{act} - ROHR_w)^2 - w_{a1}(m_2 - m_3)^2 - w_{b1}(\Delta\theta_2 - \Delta\theta_3)^2)$$ [Math 18]

In this case, the second evaluation value and the third evaluation value are evaluated between a Wiebe function according to the second combustion configuration and a Wiebe function according to the third combustion configuration. This is because the waveform of the latter half of the combustion is modeled by a combustion waveform according to two second combustion configurations and a combustion waveform according to the third combustion configuration.

Figure 19:
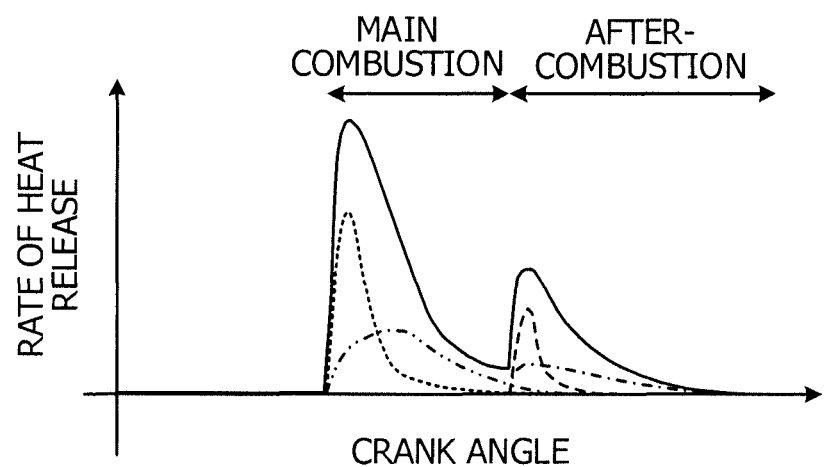
FIG. 19 is a graph of an example in which two-stage combustion is modeled by four Wiebe functions.
Figure 19:
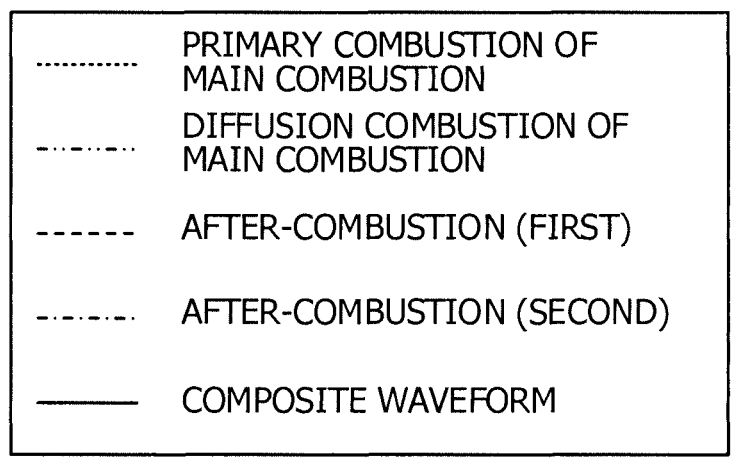

FIG. 19 illustrates an example of a combustion waveform in two-stage combustion. In the example illustrated in FIG. 19, the combustion waveform in two-stage combustion (composite waveform) may be understood as a composite of two combustion waveforms in different combustion configurations in respective stages. Specifically, a combustion waveform portion in the first stage (main combustion) may be understood as a composite of the combustion waveforms according to the first combustion configuration and the second combustion configuration, and a combustion waveform portion in the second stage (after-combustion) may be understood as a composite of the combustion waveforms according to the third combustion configuration and the fourth combustion configuration (respectively correspond to the first combustion and the second combustion in the after-combustion). Therefore, a combination of four Wiebe functions is used in the example illustrated in FIG. 19. That is, the expression of Math 4 is rewritten as follows.

$$ROHR = \sum_{i=1}^{4} ROHR_i \qquad [\text{Math 19}]$$
$$= \sum_{i=1}^{4} Q_b \cdot xf_i \cdot a_i(m_i+1) \cdot \frac{1}{\Delta\theta_i} \cdot \left[\frac{\theta-\theta_{soc_i}}{\Delta\theta_i}\right]^{m_i} \cdot$$
$$\exp\left\{-a_i \cdot \left[\frac{\theta-\theta_{soc_i}}{\Delta\theta_i}\right]^{m_i+1}\right\}$$

It is to be noted that i=1 is for the first combustion configuration, i=2 is for the second combustion configuration, i=3 is for the third combustion configuration, and i=4 is for the fourth combustion configuration. In this case, the evaluation function F is, for instance, as follows.

$$F=\min(\Sigma(ROHR_{act}-ROHR_w)^2-w_{a1}(m_1-m_2)^2-w_{a2}(m_3-m_4)^2-w_{b1}(\Delta\theta_1-\Delta\theta_2)^2-w_{b2}(\Delta\theta_3-\Delta\theta_4)^2) \qquad [\text{Math 20}]$$

In this case, the second evaluation value and the third evaluation value are respectively evaluated between a Wiebe function according to the first combustion configuration and a Wiebe function according to the second combustion configuration, and between a Wiebe function according to the three combustion configuration and a Wiebe function according to the fourth combustion configuration.

Figure 20:
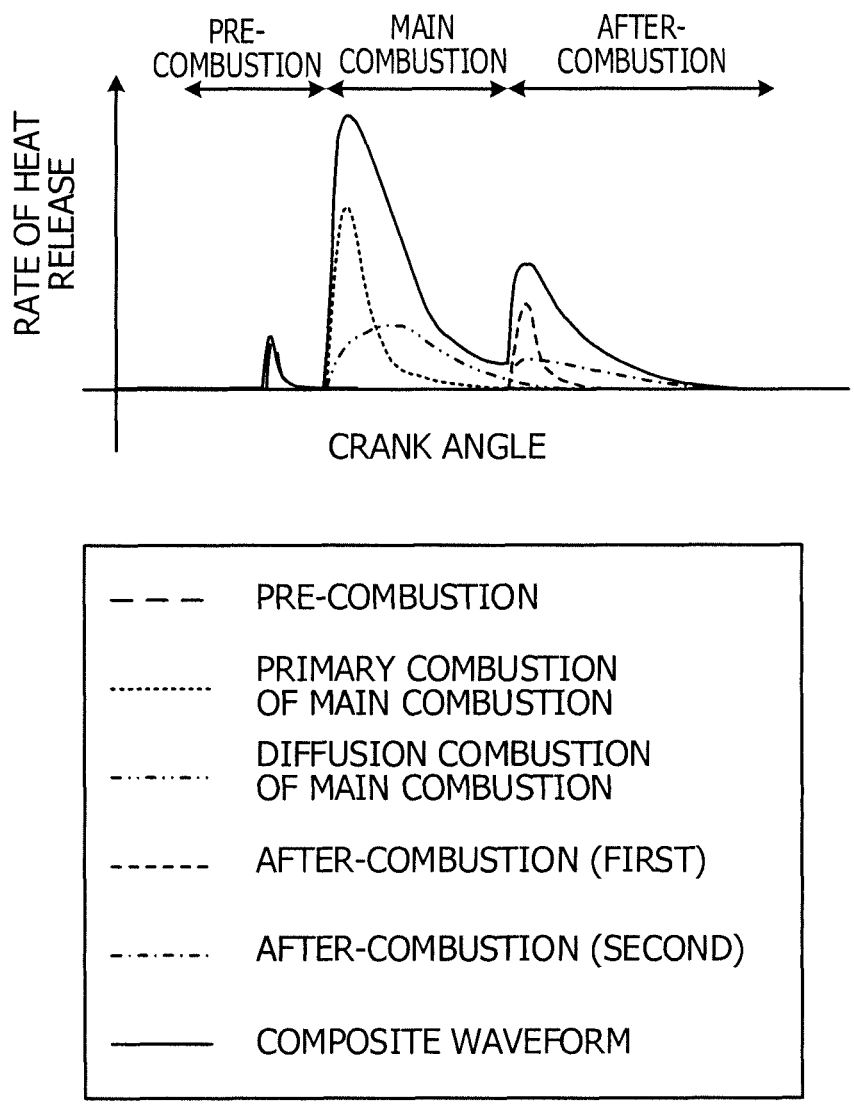
FIG. 20 is a graph of an example in which three-stage combustion is modeled by five Wiebe functions.

FIG. 20 illustrates an example of a combustion waveform in three-stage combustion. In the example illustrated in FIG. 20, the combustion waveform in three-stage combustion (composite waveform) may be understood as a composite of two combustion waveforms in different combustion configurations in the second and third stages. Specifically, a combustion waveform portion in the second stage (main combustion) may be understood as a composite of the combustion waveforms according to the second combustion configuration and the third combustion configuration, and a combustion waveform portion in the third stage (after-combustion) may be understood as a composite of the combustion waveforms according to the fourth combustion configuration and the fifth combustion configuration (respectively correspond to the first combustion and the second combustion in the after-combustion). On the other hand, a combustion waveform portion (pre-combustion) in the first stage is modeled by a (single) combustion waveform according to the first combustion configuration. Therefore, a combination of five Wiebe functions is used in the example illustrated in FIG. 20. That is, the expression of Math 4 is rewritten as follows.

$$ROHR = \sum_{i=1}^{5} ROHR_i \qquad [\text{Math 21}]$$
$$= \sum_{i=1}^{5} Q_b \cdot xf_i \cdot a_i(m_i+1) \cdot \frac{1}{\Delta\theta_i} \cdot \left[\frac{\theta-\theta_{soc_i}}{\Delta\theta_i}\right]^{m_i} \cdot$$
$$\exp\left\{-a_i \cdot \left[\frac{\theta-\theta_{soc_i}}{\Delta\theta_i}\right]^{m_i+1}\right\}$$

In this case, the evaluation function F is, for instance, as follows.

$$F=\min(\Sigma(ROHR_{act}-ROHR_w)^2-w_{a1}(m_2-m_3)^2-w_{a2}(m_4-m_5)^2-w_{b1}(\Delta\theta_2-\Delta\theta_3)^2-w_{b2}(\Delta\theta_4-\Delta\theta_5)^2) \qquad [\text{Math 22}]$$

In this case, the second evaluation value and the third evaluation value are respectively evaluated between a Wiebe function according to the second combustion configuration and a Wiebe function according to the third combustion configuration, and between a Wiebe function according to the fourth combustion configuration and a Wiebe function according to the fifth combustion configuration.

Although the combustion waveform portion (pre-combustion) in the first stage is modeled by a (single) combustion waveform according to the first combustion configuration in the example described with reference to FIG. 20, the combustion waveform portion in the first stage may be similarly modeled by a combination of at least two Wiebe functions. For instance, the combustion waveform portion (pre-combustion) in the first stage may be modeled by a combination of two Wiebe functions. In this case, a combination of six Wiebe functions is used. In this case, the valuation function F is set so that the second evaluation value and the third evaluation value are evaluated between two Wiebe functions according to the pre-combustion, between two Wiebe functions according to the main combustion, and between two Wiebe functions according to the after-combustion. In this case, the evaluation function F is, for instance, as follows.

$$F=\min(\Sigma(ROHR_{act}-ROHR_w)^2-w_{a1}(m_1-m_2)^2-w_{a2}(m_3-m_4)^2-w_{a3}(m_5-m_6)^2-w_{b1}(\Delta\theta_1-\Delta\theta_2)^2-w_{b2}(\Delta\theta_3-\Delta\theta_4)^2-w_{b3}(\Delta\theta_5-\Delta\theta_6)^2) \qquad [\text{Math 23}]$$

Although the embodiment has been described in detail above, the disclosure is not limited to particular embodiments, and various modifications and changes may be made within a scope of the appended claims. Also, all of part of the components of the above-described embodiment may be combined.

For instance, in the above-described embodiment, the evaluation function F of Math 5 uses both two evaluation values score_m and score_$\Delta\theta$ which effectively serve to differentiate between combustion configurations. However, only one of the two evaluation values may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A Wiebe function parameter identification method, the method comprising:
   acquiring, by a computer, operation data when an internal-combustion engine is in operation;
   identifying values of a plurality of parameters included in a combination of at least two Wiebe functions including a first Wiebe function and a second Wiebe function based on the operation data and a first difference between values of a same parameter of the first Wiebe function and the second Wiebe function; and
   controlling the internal-combustion engine based on the values of the parameters identified by:
   calculating current rate of heat release based on the value of each model parameter identified;
   calculating current in-cylinder pressure based on the calculated value of the current rate of heat release;

calculating a generated torque of the engine based on the calculated value of the in-cylinder pressure;

calculating a control target value of the engine to achieve a drive torque requested by the driver, based on the calculated value of the generated torque of the engine;

wherein the driver requests the drive torque according to a vehicle speed and an accelerator opening, or for supporting the operation of the vehicle; and controlling the internal-combustion engine based on the calculated control target value of the engine.

2. The Wiebe function parameter identification method according to claim 1, wherein the identifying the values of the plurality of parameters includes the identifying the values of the plurality of parameters by optimization calculation using an evaluation expression, and the evaluation expression includes a first term which becomes closer to an optimal solution as the first difference increases.

3. The Wiebe function parameter identification method according to claim 2, wherein the evaluation expression further includes a second term which becomes closer to an optimal solution as a second difference between a calculated value of a rate of heat release based on the operation data, and a calculated value of a rate of heat release based on the combination of at least two Wiebe functions decreases.

4. The Wiebe function parameter identification method according to claim 3, wherein the evaluation expression includes a weighting coefficient for each of the first term and the second term.

5. The Wiebe function parameter identification method according to claim 3, wherein the second term is a term of a sum of a square of the second difference obtained for each of a plurality of crank angles.

6. The Wiebe function parameter identification method according to claim 2, wherein the first term is a term of minus of a square of the first difference.

7. The Wiebe function parameter identification method according to claim 1, wherein the plurality of parameters include shape indexes, combustion start times, and combustion periods included in the first Wiebe function and the second Wiebe function, and the first difference includes at least one of a difference between the shape indexes and a difference between the combustion periods.

8. The Wiebe function parameter identification method according to claim 1, wherein the identifying the values of the plurality of parameters includes the identifying the values of the plurality of parameters for each of operating conditions, and a relational expression between a plurality of operating condition parameters indicating the operating conditions and the values of the plurality of parameters are derived based on the values of the plurality of parameters identified for each of the operating conditions.

9. The Wiebe function parameter identification method according to claim 8, wherein the relational expression is a first degree polynomial.

10. The Wiebe function parameter identification method according to claim 1, wherein the first Wiebe function and the second Wiebe function model respective two combustion configurations which exhibit as continuous phenomena in a cylinder of the internal-combustion engine.

11. The Wiebe function parameter identification method according to claim 10, wherein the two combustion configurations are each a combustion configuration during after-combustion in a cylinder of a diesel engine.

12. An information processing device, comprising:

a memory; and a processor coupled to the memory and configured to perform a process, the process includes;

acquiring operation data when an internal-combustion engine is in operation; and identifying values of a plurality of parameters included in a combination of at least two Wiebe functions including a first Wiebe function and a second Wiebe function based on the operation data and a first difference between values of a same parameter of the first Wiebe function and the second Wiebe function; and controlling the internal-combustion engine based on the values of the parameters identified by:

calculating current rate of heat release based on the value of each model parameter identified;

calculating current in-cylinder pressure based on the calculated value of the current rate of heat release;

calculating a generated torque of the engine based on the calculated value of the in-cylinder pressure;

calculating a control target value of the engine to achieve a drive torque requested by the driver, based on the calculated value of the generated torque of the engine;

wherein the driver requests the drive torque according to a vehicle speed and an accelerator opening, or for supporting the operation of the vehicle; and controlling the internal-combustion engine based on the calculated control target value of the engine.

13. The information processing device according to claim 12, wherein the identifying the values of the plurality of parameters includes the identifying the values of the plurality of parameters by optimization calculation using an evaluation expression, and the evaluation expression includes a first term which becomes closer to an optimal solution as the first difference increases.

14. The information processing device according to claim 13, wherein the evaluation expression further includes a second term which becomes closer to an optimal solution as a second difference between a calculated value of a rate of heat release based on the operation data, and a calculated value of a rate of heat release based on the combination of at least two Wiebe functions decreases.

15. The information processing device according to claim 14, wherein the evaluation expression includes a weighting coefficient for each of the first term and the second term.

16. The information processing device according to claim 12, wherein the plurality of parameters include shape indexes, combustion start times, and combustion periods included in the first Wiebe function and the second Wiebe function, and the first difference includes at least one of a difference between the shape indexes and a difference between the combustion periods.

17. The information processing device according to claim 12, wherein the identifying the values of the plurality of parameters includes the identifying the values of the plurality of parameters for each of operating conditions, and a relational expression between a plurality of operating condition parameters indicating the operating conditions and the values of the plurality of parameters are derived based on the values of the plurality of parameters identified for each of the operating conditions.

18. The information processing device according to claim 17, wherein the relational expression is a first degree polynomial.

19. The information processing device according to claim 12, wherein the first Wiebe function and the second Wiebe function model respective two combustion configurations which exhibit as continuous phenomena in a cylinder of the internal-combustion engine.

20. The information processing device according to claim 19, wherein the two combustion configurations are each a combustion configuration during after-combustion in a cylinder of a diesel engine.

* * * * *